(12) United States Patent
Matsunaga et al.

(10) Patent No.: US 11,038,609 B2
(45) Date of Patent: Jun. 15, 2021

(54) SENSING SYSTEM AND TIME SYNCHRONIZATION METHOD

(71) Applicant: NIPPON TELEGRAPH AND TELEPHONE CORPORATION, Tokyo (JP)

(72) Inventors: Kenichi Matsunaga, Tokyo (JP); Shoichi Oshima, Tokyo (JP); Ahmed Musa, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 103 days.

(21) Appl. No.: 16/473,995

(22) PCT Filed: Dec. 22, 2017

(86) PCT No.: PCT/JP2017/046111
§ 371 (c)(1),
(2) Date: Jun. 26, 2019

(87) PCT Pub. No.: WO2018/123857
PCT Pub. Date: Jul. 5, 2018

(65) Prior Publication Data
US 2020/0153527 A1 May 14, 2020

(30) Foreign Application Priority Data
Dec. 28, 2016 (JP) .............................. JP2016-255165

(51) Int. Cl.
*H04J 3/06* (2006.01)
(52) U.S. Cl.
CPC .......... *H04J 3/0667* (2013.01); *H04J 3/0664* (2013.01); *H04J 3/0673* (2013.01); *H04J 3/0682* (2013.01); *H04J 3/0697* (2013.01)

(58) Field of Classification Search
CPC ...... H04J 3/0667; H04J 3/0664; H04J 3/0673; H04J 3/0682; H04J 3/0697; H04L 7/00; H04Q 9/00; G04G 7/00; G08C 15/06
See application file for complete search history.

(56) References Cited

U.S. PATENT DOCUMENTS 8,462,821 B1 6/2013 Sagarwala et al.
2010/0103878 A1 4/2010 Fujiwara et al.
(Continued)

FOREIGN PATENT DOCUMENTS

CN 102571253 A 7/2012
CN 103945525 A 7/2014
(Continued)

OTHER PUBLICATIONS

Supplementary European Search Report and Search Opinion received for EP Patent Application No. 17887491.3, dated Aug. 26, 2020, 8 pages.
(Continued)

*Primary Examiner* — Tejis Daya
(74) *Attorney, Agent, or Firm* — Womble Bond Dickinson (US) LLP

(57) ABSTRACT

Upon receiving a dummy packet, a data collection terminal slave device (2) appends, to a return packet, a timestamp indicating the reception time of the dummy packet and a timestamp indicating the transmission time of the return packet, and transmits the return packet to a data collection terminal master device (3). When performing a time synchronization process, the data collection terminal master device (3) transmits the dummy packet to the data collection terminal slave device (2). Upon receiving the return packet, the data collection terminal master device (3) calculates a synchronization deviation time of the data collection terminal master device (3) and the data collection terminal slave device (2) and a propagation delay time between the data
(Continued)

collection terminal master device (3) and the data collection terminal slave device (2), based on the transmission time of the dummy packet and the reception time of the return packet, and the reception time of the dummy packet and the transmission time of the return packet obtained from the timestamps of the return packet.

17 Claims, 23 Drawing Sheets

(56) References Cited

U.S. PATENT DOCUMENTS

| | | | | |
|---|---|---|---|---|
| 2013/0012220 | A1* | 1/2013 | Waris | H04W 4/021 455/450 |
| 2013/0272322 | A1* | 10/2013 | Sagarwala | H04J 3/0658 370/508 |
| 2014/0119391 | A1* | 5/2014 | Yamamoto | H04J 3/0688 370/516 |
| 2016/0021169 | A1* | 1/2016 | Chan | H04L 67/04 709/217 |
| 2016/0055509 | A1* | 2/2016 | Nyberg | G06F 21/44 705/14.1 |
| 2017/0041357 | A1* | 2/2017 | Wang | H04L 65/4015 |
| 2018/0212856 | A1* | 7/2018 | Shigehisa | H04N 21/8106 |

FOREIGN PATENT DOCUMENTS

| | | |
|---|---|---|
| CN | 104396180 A | 3/2015 |
| CN | 106028272 A | 10/2016 |
| CN | 110249372 A | 9/2019 |
| JP | 2005-151153 A | 6/2005 |
| JP | 2014-202734 A | 10/2014 |
| JP | 2014-241024 A | 12/2014 |

OTHER PUBLICATIONS

Office Action received for Chinese Patent Application No. 201780081227.5, dated Jul. 21, 2020, 9 pages (6 pages of English Translation and 3 pages of Office Action).

International Preliminary Report on Patentability received for PCT Patent Application No. PCT/JP2017/046111, dated Jul. 11, 2019, 10 pages (6 pages of English Translation and 4 pages of Original Document).

International Search Report and Written Opinion received for PCT Patent Application No. PCT/JP2017/046111, dated Feb. 13, 2018, 10 pages (5 pages of English Translation and 5 pages of Original Document).

Matsunaga et al., "IoT Gateway Technology for Connecting Various Sensors", The institute of Electronics, Information and Communication Engineers, Proceedings of the 2016 Society Conference, NTT Device Innovation Center, B-18-56, 2016, 5 pages (4 pages of English Translation and 1 page of Original Document).

Suzuki et al., "Research Trends of Time Synchronization Technologies in Wireless Sensor Networks", The University of Tokyo, Research Center for Advanced Science and Technology, Morikawa Laboratory, Technical Research Report, No. 2008001, Jun. 2008, 18 pages (10 pages of English Translation and 8 pages of Original Document).

* cited by examiner

Clock Drift using TPSN

SENSING SYSTEM AND TIME SYNCHRONIZATION METHOD

TECHNICAL FIELD

The present invention relates to a technique of obtaining time synchronization between sensor data transmitted from sensors in a sensing system accommodating many various kinds of sensors.

BACKGROUND ART

In an IoT (Internet of Things) society in which all things are connected to the Internet, it is expected that various kinds of sensors are connected to networks, a large amount of various kinds of data are collected, and information useful for humans is extracted by analyzing the data. An example shown in FIG. 23 proposes a sensor network in which sensor data obtained by a wearable sensor 100 formed by attaching a sensor to clothing to be put on a person is transferred to a server 102 via a terminal 101 such as a smartphone (see non-patent literature 1). In a sensor network like this, the terminal 101 accommodating the sensor 100 is required to meet various kinds of use cases and needs, so the operation may pose problems if only currently prevalent smartphones are used.

In particular, a smartphone makes it difficult to simultaneously connect a large number of sensors. As a measure against this difficulty, as shown in FIG. 24, the number of connectable sensors can be increased by giving a tree-like configuration to a network of sensor accommodating terminals. In this example shown in FIG. 24, each sensor accommodating terminal 101a obtains data from sensors 100 and transmits the data to a terminal master device 101b.

In the configuration shown in FIG. 24, however, sensor data obtained from the sensor 100 by each sensor accommodating terminal 101a is given time information and then transmitted to the terminal master device 101b, so there is no common time reference between sensor data obtained by the sensor accommodating terminals 101a. This poses the problem that these sensor data cannot be arranged in time series. Therefore, as a time synchronization method for a sensor network application, various methods as shown in Table 1 have been proposed (see non-patent literature 2).

NTP (Network Time Protocol), RBS (Reference Broadcast Synchronization), FTSP (Flooding Time Synchronization Protocol), and TPSN (Timing-sync Protocol for Sensor Network) are protocols for obtaining time synchronization between sensors and computers on a network. GPS (Global Positioning System) shown in Table 1 means a time synchronization method of deriving an accurate reference time on the receiving device side based on time information obtained from a plurality of GPS satellites.

Unfortunately, the conventional time synchronization methods as shown in Table 1 are based on the assumption that each of a master device and a slave device has a sufficiently accurate clock, and this poses the problem that the configuration of a terminal is restricted. More specifically, the conventional time synchronization methods cannot be applied to a terminal that handles time by using only a monotonously increasing incremental counter. Also, when correcting time, it is necessary to use a method that corrects a deviation of a terminal clock while correcting a time drift, a calculation of a propagation delay of time information, and the time required for the calculation. This increases the required performance of a microcomputer or a CPU (Central Processing Unit), and restricts the configuration of a terminal.

Furthermore, to correct a deviation of a sensor clock in a system in which a sensor itself appends a timestamp to sensor data, the required performance of a microcomputer or a CPU of the sensor increases, and this restricts the configuration of the sensor.

RELATED ART LITERATURE

Patent Literature

Non-Patent Literature 1: "IoT Gateway Technology for Connecting Various Sensors", Kenichi Matsunaga et al., The institute of Electronics, Information and Communication Engineers, Proceedings of the 2016 Society Conference, B-18-56, p. 420

Non-Patent Literature 2: Makoto Suzuki, Shunsuke Saruwatari, Masaki Minami, and Hiroyuki Morikawa, "Research Trends of Time Synchronization Technologies in Wireless Sensor Networks", The University of Tokyo, Research Center for Advanced Science and Technology, Morikawa Laboratory, Technical Research Report, No. 2008001, June, 2008

TABLE 1

| Name | Assumed environment | Principle | Accuracy | Drawbacks |
| --- | --- | --- | --- | --- |
| NTP | Remote/wired/two-way communication | Timestamp exchange | Δ | IP support is essential → large overhead |
| RBS | Neighborhood/inter-slave device communication | Timestamp of broadcast packet | Δ | Increase in slave devices → increase in communication amount |
| FTSP | Neighborhood/one-way communication | Timestamp in wireless MAC layer | ◯ | MAC layer operation is essential → WiFi and BT are unusable |
| TPSN | Neighborhood/tree-type/two-way communication | Timestamp exchange | ◯ | Customized installation of backend is necessary |
| GPS | Outdoor/one-way communication | Timestamp of GPS | ◎ | Unusable in building, power consumption |

DISCLOSURE OF INVENTION

Problem to be Solved by the Invention

The present invention has been made to solve the above problems, and has as its object to provide a sensing system and time synchronization method capable of obtaining accurate time synchronization between sensor data transmitted from sensors, even when the computation performance and clock accuracy of each sensor are low.

In addition, the present invention has as its another object to provide a sensing system and time synchronization method capable of obtaining accurate time synchronization between sensor data transmitted from sensors, even when the computation performance and clock accuracy of a slave device are low.

Means of Solution to the Problem

A sensing system of the present invention is characterized by including not less than one sensor configured to transmit sensor data, a data collection terminal master device configured to transmit the sensor data to a host apparatus, and a data collection terminal slave device configured to relay the sensor data between the sensor and the data collection terminal master device, wherein the sensor includes a first clock unit configured to measure time, a timestamp appending unit configured to append, to the sensor data, a timestamp indicating data transmission time based on time information of the first clock unit, when transmitting the sensor data, a return packet generation unit configured to generate a return packet, upon receiving a dummy packet from the data collection terminal master device via the data collection terminal slave device, and append, to the return packet, a timestamp indicating reception time of the dummy packet based on the time information of the first clock unit, and a timestamp indicating transmission time of the return packet, and a first communication processing unit configured to transmit, to the data collection terminal slave device, the sensor data to which the timestamp is appended by the timestamp appending unit, and the return packet to which the timestamps are appended by the return packet generation unit, and the data collection terminal master device includes a second clock unit configured to measure time, a dummy packet transmission unit configured to transmit the dummy packet to the sensor, when performing a time synchronization process, a time calculation unit configured to calculate, upon receiving the return packet, a synchronization deviation time of the data collection terminal master device and the sensor and a propagation delay time between the data collection terminal master device and the sensor, based on the transmission time of the dummy packet and the reception time of the return packet obtained from the time information of the second clock unit, and the reception time of the dummy packet and the transmission time of the return packet obtained from the timestamps of the return packet, a corrected time calculation unit configured to calculate corrected data transmission time, upon receiving the sensor data, based on the data transmission time obtained from the timestamp of the sensor data, and the synchronization deviation time and the propagation delay time, a timestamp correction unit configured to correct the timestamp of the sensor data based on a calculation result of the corrected time calculation unit, and a second communication processing unit configured to transfer the sensor data containing the timestamp corrected by the timestamp correction unit to the host apparatus.

A sensing system of the present invention is characterized by including not less than one sensor configured to transmit sensor data, a data collection terminal master device configured to transmit the sensor data to a host apparatus, and a data collection terminal slave device configured to relay the sensor data between the sensor and the data collection terminal master device, wherein the data collection terminal slave device includes a first clock unit configured to measure time, a timestamp appending unit configured to append, to the sensor data, a timestamp indicating data transmission time based on time information of the first clock unit, upon receiving the sensor data from the sensor, a return packet generation unit configured to generate a return packet, upon receiving a dummy packet from the data collection terminal master device, and append, to the return packet, a timestamp indicating reception time of the dummy packet based on the time information of the first clock unit, and a timestamp indicating transmission time of the return packet, and a first communication processing unit configured to transmit, to the data collection terminal master device, the sensor data to which the timestamp is appended by the timestamp appending unit, and the return packet to which the timestamps are appended by the return packet generation unit, and the data collection terminal master device includes a second clock unit configured to measure time, a dummy packet transmission unit configured to transmit the dummy packet to the data collection terminal slave device, when performing a time synchronization process, a time calculation unit configured to calculate, upon receiving the return packet, a synchronization deviation time of the data collection terminal master device and the data collection terminal slave device and a propagation delay time between the data collection terminal master device and the data collection terminal slave device, based on the transmission time of the dummy packet and the reception time of the return packet obtained from the time information of the second clock unit, and the reception time of the dummy packet and the transmission time of the return packet obtained from the timestamps of the return packet, a corrected time calculation unit configured to calculate corrected data transmission time, upon receiving the sensor data, based on the data transmission time obtained from the timestamp of the sensor data, and the synchronization deviation time and the propagation delay time, a timestamp correction unit configured to correct the timestamp of the sensor data based on a calculation result of the corrected time calculation unit, and a second communication processing unit configured to transfer the sensor data containing the timestamp corrected by the timestamp correction unit to the host apparatus.

A time synchronization method of the present invention is characterized by including a first step of causing a data collection terminal master device to transmit a dummy packet to a sensor when performing a time synchronization process, a second step of causing the sensor to generate a return packet upon receiving the dummy packet from the data collection terminal master device via a data collection terminal slave device, and append, to the return packet, a timestamp indicating reception time of the dummy packet and a timestamp indicating transmission time of the return packet, based on time information of a first clock unit in the sensor, a third step of causing the sensor to transmit the return packet to which the timestamps are appended, to the data collection terminal slave device, a fourth step of causing, upon receiving the return packet from the sensor via the data collection terminal slave device, the data collection terminal master device to calculate a synchronization deviation time of the data collection terminal master device and the sensor and a propagation delay time between the data collection terminal master device and the sensor, based on the transmission time of the dummy packet and the reception time of the return packet obtained from time information of a second clock unit in the data collection terminal master device, and the reception time of the dummy packet and the transmission time of the return packet obtained from the timestamps of the return packet, a fifth step of causing, when transmitting sensor data, the sensor to append a timestamp indicating data transmission time to the sensor data based on the time information of the first clock unit, a sixth step of causing the sensor to transmit the sensor data to which the timestamps are appended, to the data collection terminal slave device, a seventh step of causing, upon receiving the sensor data from the sensor via the data collection terminal slave device, the data collection terminal master device to calculate corrected data transmission time, based on the data transmission time obtained from the timestamp of the sensor data, and the synchronization deviation time and the propagation delay time, an eighth step of causing the data collection terminal master device to correct the timestamp of the sensor data based on a calculation result in the seventh step, and a ninth step of causing the data collection terminal master device to transfer the sensor data containing the corrected timestamp to a host apparatus.

A time synchronization method of the present invention is characterized by including a first step of causing a data collection terminal master device to transmit a dummy packet to a data collection terminal slave device when performing a time synchronization process, a second step of causing the data collection terminal slave device to generate a return packet upon receiving the dummy packet, and append, to the return packet, a timestamp indicating reception time of the dummy packet and a timestamp indicating transmission time of the return packet, based on time information of a first clock unit in the data collection terminal slave device, a third step of causing the data collection terminal slave device to transmit the return packet to which the timestamps are appended, to the data collection terminal master device, a fourth step of causing, upon receiving the return packet, the data collection terminal master device to calculate a synchronization deviation time of the data collection terminal master device and the data collection terminal slave device and a propagation delay time between the data collection terminal master device and the data collection terminal slave device, based on the transmission time of the dummy packet and the reception time of the return packet obtained from time information of a second clock unit in the data collection terminal master device, and the reception time of the dummy packet and the transmission time of the return packet obtained from the timestamps of the return packet, a fifth step of causing, upon receiving sensor data from a sensor, the data collection terminal slave device to append a timestamp indicating data transmission time to the sensor data based on the time information of the first clock unit, a sixth step of causing the data collection terminal slave device to transmit the sensor data to which the timestamps are appended, to the data collection terminal master device, a seventh step of causing, upon receiving the sensor data from the data collection terminal slave device, the data collection terminal master device to calculate corrected data transmission time, based on the data transmission time obtained from the timestamp of the sensor data, and the synchronization deviation time and the propagation delay time, an eighth step of causing the data collection terminal master device to correct the timestamp of the sensor data based on a calculation result in the seventh step, and a ninth step of causing the data collection terminal master device to transfer the sensor data containing the corrected timestamp to a host apparatus.

Effect of the Invention

In the present invention, the sensor includes the first clock unit, the timestamp appending unit, the return packet transmission unit, and the first communication processing unit, and the data collection terminal master device includes the second clock unit, the dummy packet transmission unit, the time calculation unit, the corrected time calculation unit, the timestamp correction unit, and the second communication processing unit. Accordingly, even when the computation performance of the sensor and the clock accuracy of the first clock unit are low, accurate time synchronization can be performed between sensor data transmitted from individual sensors. As a consequence, the present invention can relax the performance criterion required of the sensor in the sensing system in which the sensor itself appends a timestamp to sensor data.

In the present invention, the data collection terminal slave device includes the first clock unit, the timestamp appending unit, the return packet transmission unit, and the first communication processing unit, and the data collection terminal master device includes the second clock unit, the dummy packet transmission unit, the time calculation unit, the corrected time calculation unit, the timestamp correction unit, and the second communication processing unit. Therefore, even when the computation performance of the data collection terminal slave device and the clock accuracy of the first clock unit are low, accurate time synchronization can be performed between sensor data transmitted from individual sensors. Consequently, the present invention can relax the performance criterion required of the data collection terminal slave device.

BEST MODE FOR CARRYING OUT THE INVENTION

First Embodiment

Figure 1:
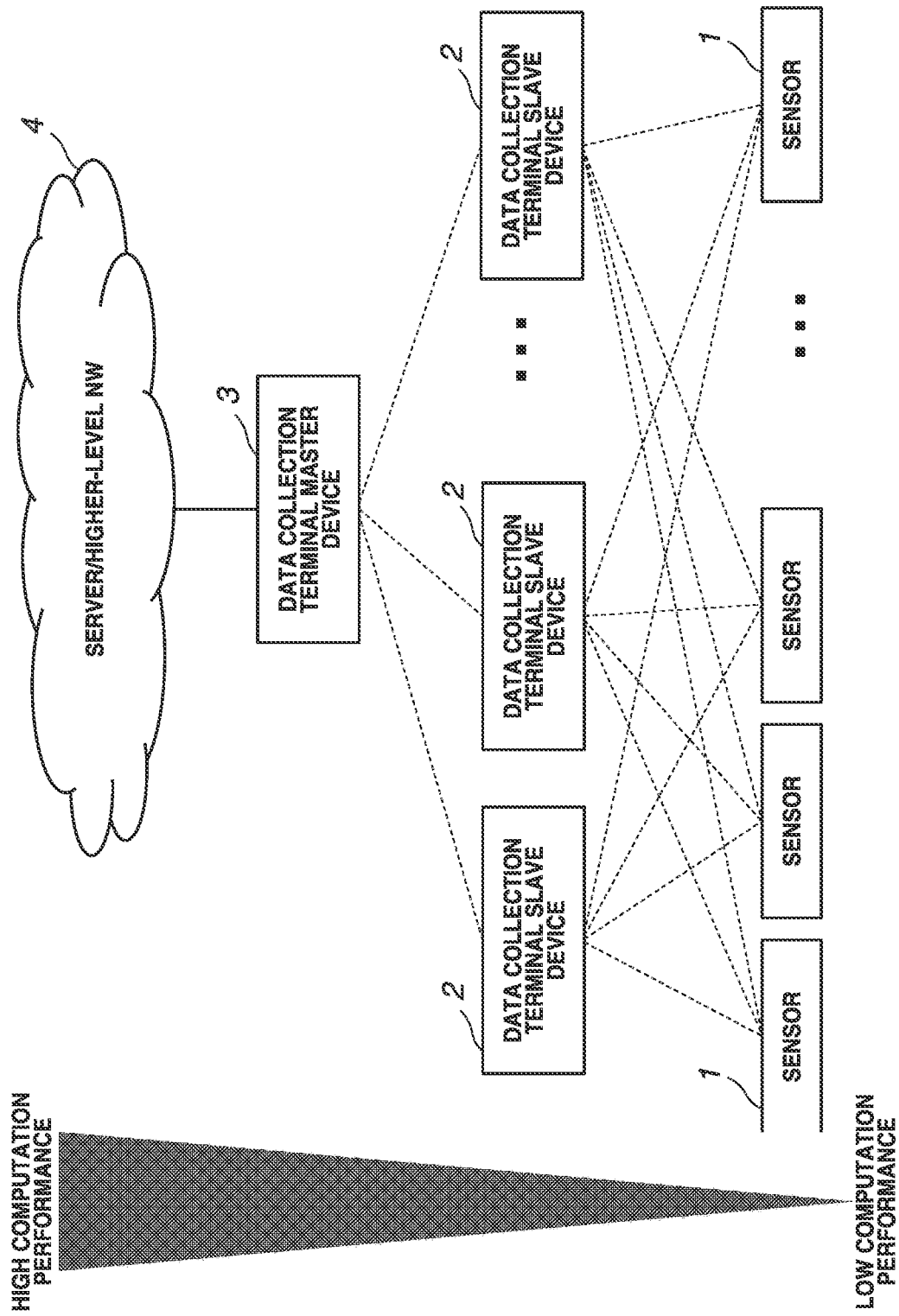
FIG. 1 is a block diagram showing the configuration of a sensing system according to the first embodiment of the present invention.

Embodiments of the present invention will be explained below with reference to the accompanying drawings. FIG. 1 is a block diagram showing the configuration of a sensing system according to the first embodiment of the present invention. This sensing system includes one or more sensors 1 for transmitting sensor data, a plurality of data collection terminal slave devices 2 for relaying the sensors 1 and a data collection terminal master device 3, and the data collection terminal master device 3 for transmitting the sensor data to a higher-level network 4.

To solve the abovementioned problems, the present invention first tries to apply the calculation load to the higher-level network as much as possible. FIG. 1 shows a tree-type network configuration for which the use of the present invention is suitable, and the computation performance of each constituent element. Generally, devices such as the sensor 1 and the data collection terminal slave device 2 close to things and persons are required to perform low-power operations, and hence use a microcomputer or a CPU having performance lower than that of a microcomputer or a CPU used by the constituent element of the higher-level network. By contrast, higher-level constituent elements of the network can use a CPU having higher performance. That is, a time synchronization system configuration that is optimum when viewed from the whole network can be obtained by applying the calculation load to higher-level constituent elements.

Figure 2:
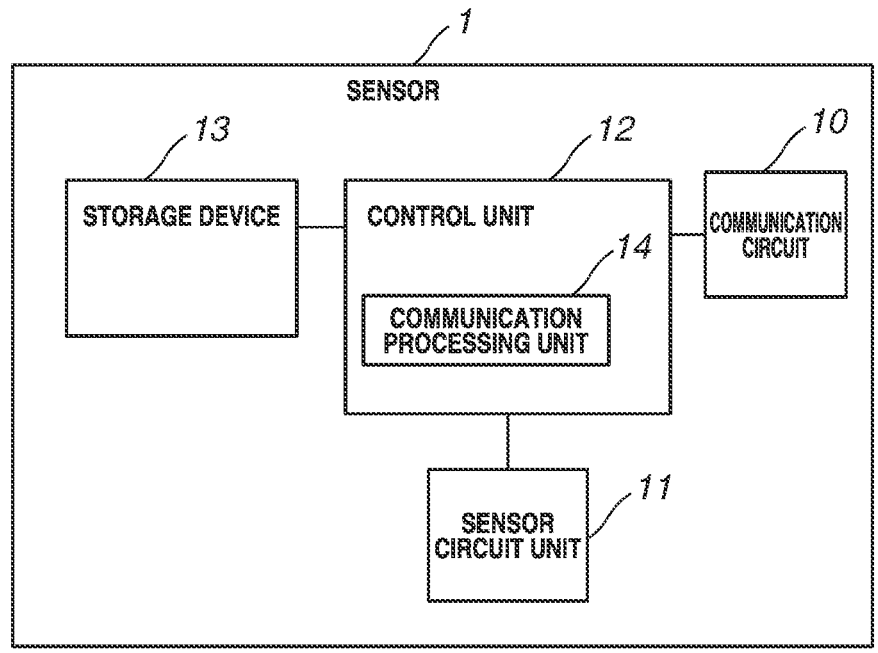
FIG. 2 is a block diagram showing the arrangement of a sensor of the sensing system according to the first embodiment of the present invention.
Figure 3:
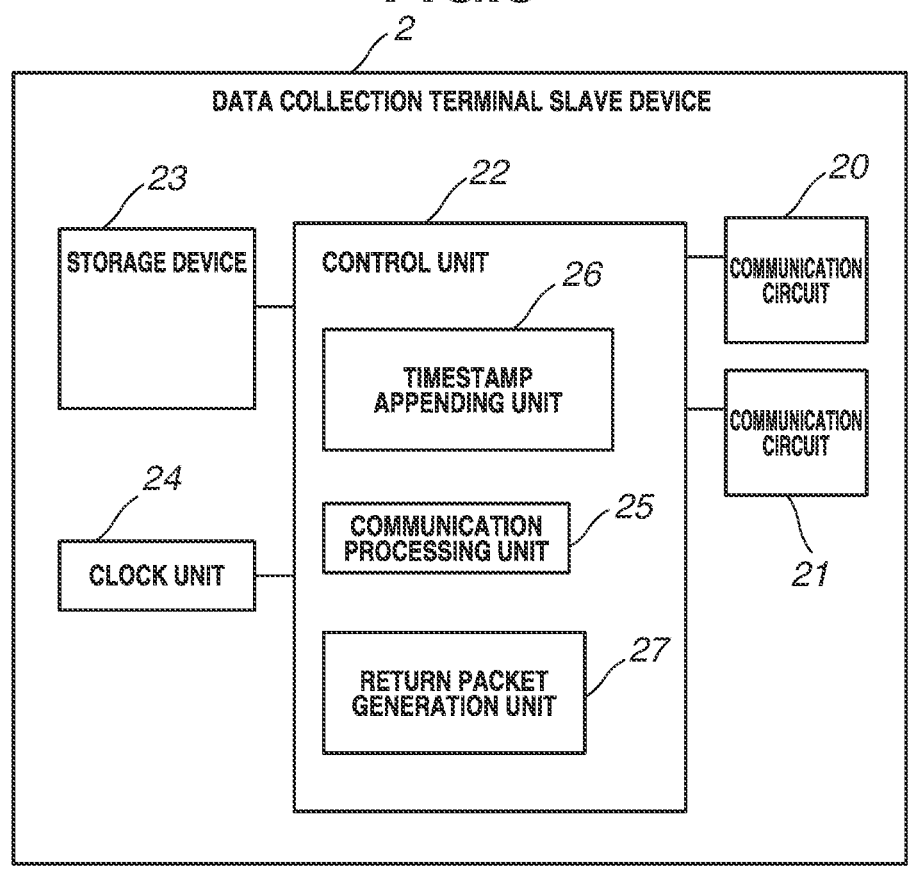
FIG. 3 is a block diagram showing the arrangement of a data collection terminal slave device of the sensing system according to the first embodiment of the present invention.
Figure 4:
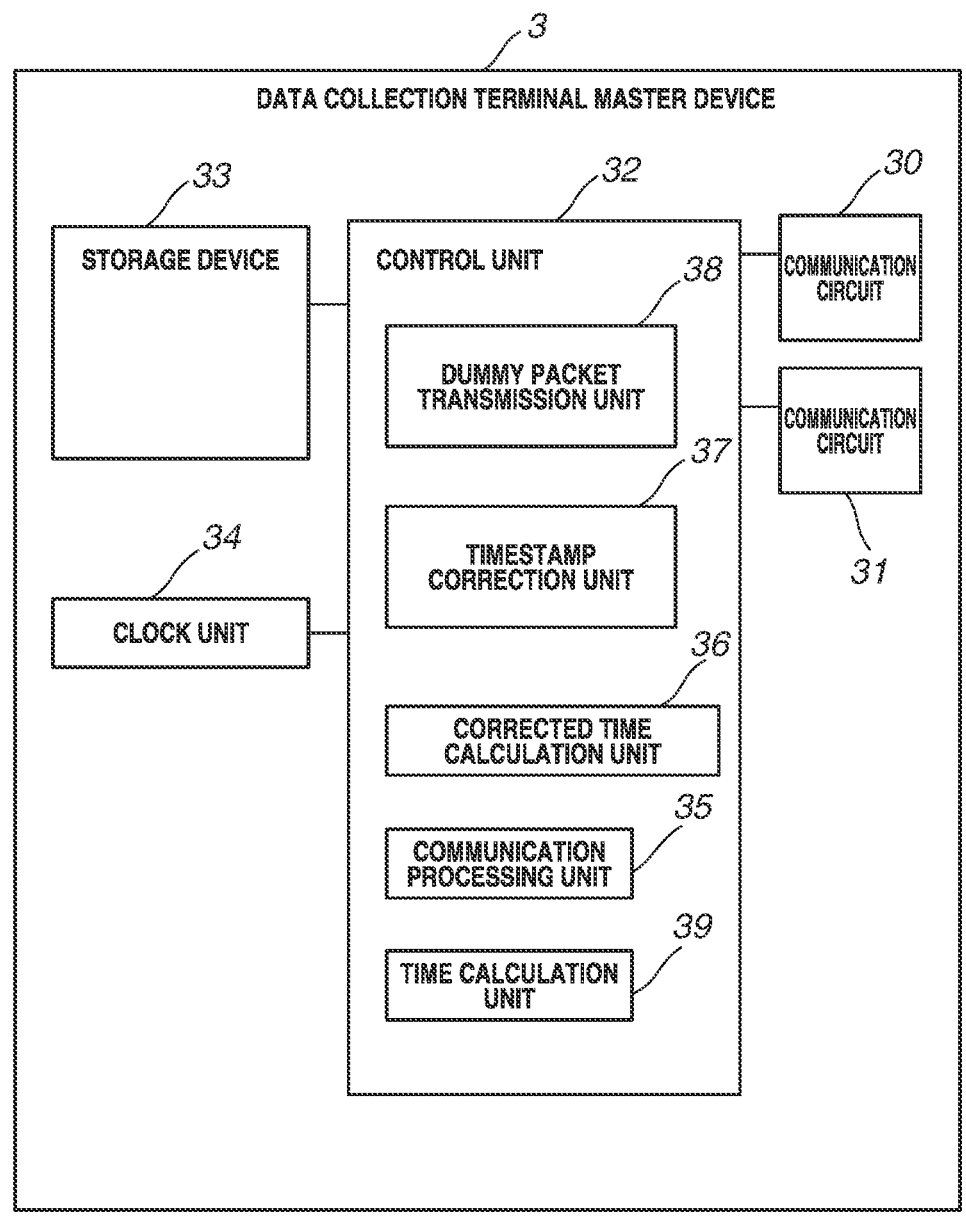
FIG. 4 is a block diagram showing the arrangement of a data collection terminal master device of the sensing system according to the first embodiment of the present invention.

FIG. 2 is a block diagram showing the arrangement of the sensor 1 of this embodiment. FIG. 3 is a block diagram showing the arrangement of the data collection terminal slave device 2. FIG. 4 is a block diagram showing the arrangement of the data collection terminal master device 3.

As shown in FIG. 2, the sensor 1 includes a communication circuit 10 for communicating with the data collection terminal slave device 2, a sensor circuit unit 11 for detecting a physical amount and extracting a feature amount from the physical amount as needed, a control unit 12 for controlling the whole sensor, and a storage device 13 for storing programs of the control unit 12. The control unit 12 includes a communication processing unit 14.

The sensor 1 can be implemented by a computer including a CPU, a storage device, and an interface, and programs for controlling these hardware resources. The CPU of the sensor 1 executes processes to be explained in this embodiment or in the following embodiments in accordance with the programs stored in the storage device. Examples of the sensor 1 for measuring a physical amount are a vital sensor for measuring a human vital sign, and an acceleration sensor. However, the present invention is, of course, not limited to these sensors.

As shown in FIG. 3, the data collection terminal slave device 2 includes a communication circuit 20 for communicating with the sensor 1, a communication circuit 21 for communicating with the data collection terminal master device 3, a control unit 22 for controlling the whole data collection terminal slave device, a storage device 23 for storing programs of the control unit 22, and a clock unit 24 for measuring time. The control unit 22 includes a communication processing unit 25 for communicating with the sensor 1 and the data collection terminal master device 3 via the communication circuits 20 and 21, a timestamp appending unit 26 for appending a timestamp indicating data transmission time to sensor data upon receiving the sensor data from the sensor 1, and a return packet generation unit 27 for generating a return packet upon receiving a dummy packet from the data collection terminal master device 3.

The data collection terminal slave device 2 can be implemented by a computer including a CPU, a storage device, and an interface, and programs for controlling these hardware resources. The CPU of the data collection terminal slave device 2 executes processes to be explained in this embodiment or in the following embodiments in accordance with the programs stored in the storage device.

The sensor 1 and the data collection terminal slave device 2 can be connected by either wired or wireless connection. When wirelessly connecting the sensor 1 and the data collection terminal slave device 2, an example of the wireless communication standard of the communication circuits 10 and 20 is BLE (Bluetooth® Low Energy).

As shown in FIG. 4, the data collection terminal master device 3 includes a communication circuit 30 for communicating with the data collection terminal slave device 2, a communication circuit 31 for communicating with, e.g., a server (host apparatus) across the higher-level network 4, a control unit 32 for controlling the whole data collection terminal master device, a storage device 33 for storing programs of the control unit 32, and a clock unit 34. The control unit 32 includes a communication processing unit 35 for communicating with the data collection terminal slave device 2 and the server of the higher-level network 4 via the communication circuits 30 and 31, a corrected time calculation unit 36 for calculating corrected data transmission time upon receiving sensor data, a timestamp correction unit 37 for correcting the timestamp of the sensor data based on the calculation result of the corrected time calculation unit 36, a dummy packet transmission unit 38 for transmitting a dummy packet to the data collection terminal slave device 2 when performing a time synchronization process, and a time calculation unit 39 for calculating a synchronization deviation time of the data collection terminal master device 3 and the data collection terminal slave device 2, and a propagation delay time between the data collection terminal master device 3 and the data collection terminal slave device 2.

The data collection terminal master device 3 can be implemented by a computer including a CPU, a storage device, and an interface, and programs for controlling these hardware resources. The CPU of the data collection terminal master device 3 executes processes to be explained in this embodiment or in the following embodiments in accordance with the programs stored in the storage device.

The data collection terminal master device 3 and the data collection terminal slave device 2 can be connected by either wired or wireless connection. When wirelessly connecting the data collection terminal master device 3 and the data collection terminal slave device 2, examples of the wireless communication standard of the communication circuits 21 and 30 are WiFi and ZigBee. Also, when wirelessly connecting the data collection terminal master device 3 and the server of the higher-level network 4, examples of the wireless communication standard of the communication circuit 31 are WiFi and LTE/3G.

Note that the data collection terminal master device 3 includes the high-performance CPU and the high-accuracy clock unit 34 called RTC (Real-Time Clock) that is controlled by the CPU, whereas the data collection terminal slave device 2 includes the low-performance CPU and the low-accuracy clock unit 24 that is controlled by the CPU. While the clock unit 34 can output time information by year, month, day, hour, minute, and second, time information which the clock unit 24 outputs is a clock counting result, i.e., an integral value.

The operation of each element of the sensing system of this embodiment will be explained below. First, a process of transferring sensor data including the measurement result of the sensor 1 to the server of the higher-level network 4 will be explained with reference to FIG. 5.

Figure 5:
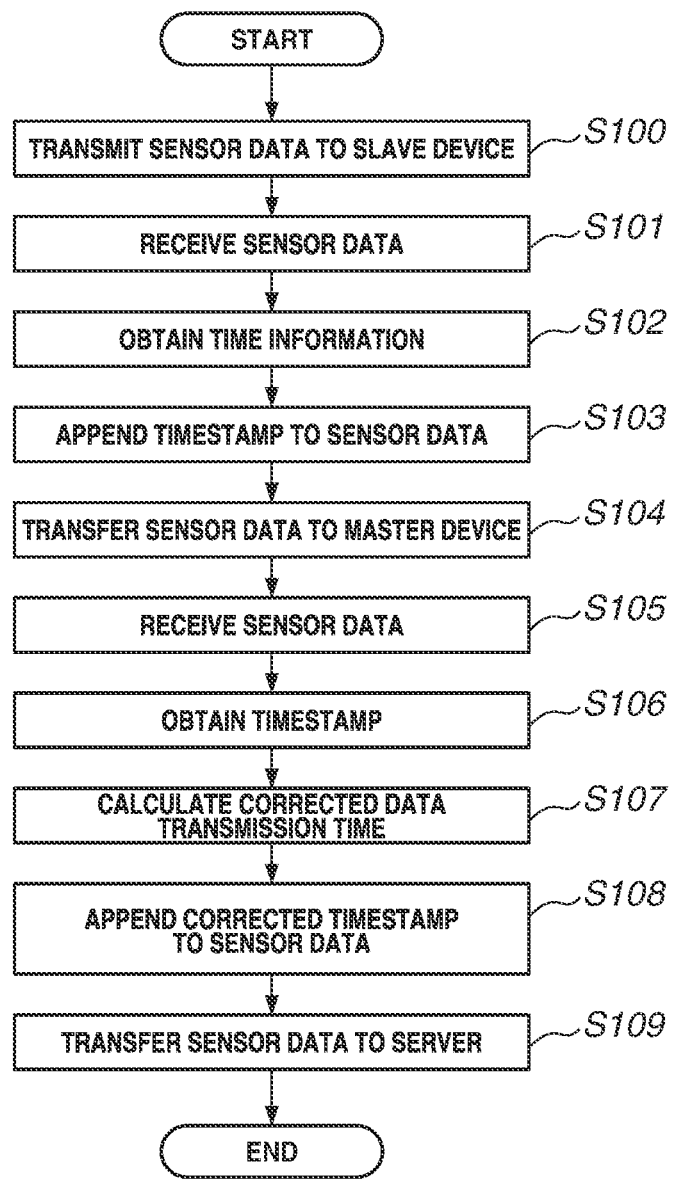
FIG. 5 is a flowchart for explaining a sensor data transfer process of the sensing system according to the first embodiment of the present invention.

The communication unit 14 of each sensor 1 causes the communication circuit 10 to transmit sensor data (a packet) containing information of the physical amount measured by the sensor circuit unit 11 and a unique sensor ID prestored in the storage device 13 (step S100 of FIG. 5).

When the communication circuit 20 receives the sensor data transmitted from the sensor 1 (step S101 of FIG. 5), the timestamp appending unit 26 of the data collection terminal slave device 2 obtains time information (an integral value) from the clock unit 24 (step S102 of FIG. 5), and appends a timestamp $TS_A$ indicating this time information to the received sensor data (step S103 of FIG. 5).

The communication processing unit 25 of the data collection terminal slave device 2 causes the communication circuit 21 to transfer the sensor data to which the timestamp $TS_A$ is appended (a sensor data packet containing the sensor data and the timestamp $TS_A$) to the data collection terminal master device 3 (step S104 of FIG. 5). Thus, the sensor data to which the timestamp $TS_A$ indicating the time of data transmission from the data collection terminal slave device 2 to the data collection terminal master device 3 is appended can be transferred to the data collection terminal master device 3. Whenever sensor data is received from the sensor 1, the data collection terminal slave device 2 performs the processes in steps S101 to S104.

Then, when the communication circuit 30 receives the sensor data transmitted from the data collection terminal slave device 2 (step S105 of FIG. 5), the corrected time calculation unit 36 of the data collection terminal master device 3 obtains the timestamp $TS_A$ contained in the sensor data (step S106 of FIG. 5), and calculates corrected data transmission time T based on the time indicated by the obtained timestamp $TS_A$ (step S107 of FIG. 5). The process in step S107 will be described later.

The timestamp correction unit 37 of the data collection terminal master device 3 appends a timestamp $TS_B$ indicating the data transmission time T calculated by the corrected time calculation unit 36 to the sensor data received by the communication circuit 30 (step S108 of FIG. 5). Note that the timestamp $TS_A$ to be appended by the timestamp appending unit 26 of the data collection terminal slave device 2 represents an integral value, whereas the timestamp $TS_B$ to be appended by the timestamp correction unit 37 of the data collection terminal master device 3 represents year, month, day, hour, minute, and second. The timestamp $TS_A$ appended by the timestamp appending unit 26 can be deleted by the process in step S108 and can also be left behind.

The communication processing unit 35 of the data collection terminal master device 3 causes the communication circuit 31 to transfer the sensor data to which the timestamp $TS_B$ is appended (the sensor data packet containing the sensor data and the timestamp $TS_B$) to the server of the higher-level network 4 (step S109 of FIG. 5). Thus, the sensor data can be transferred to the server by correcting the time of data transmission from the data collection terminal slave device 2 to the data collection terminal master device 3.

An example of the server processing is a process of diagnosing a user by analyzing a user's vital sign obtained by the sensor 1. Since the server processing is not an essential constituent element of the present invention, a detailed explanation will be omitted.

Figure 6:
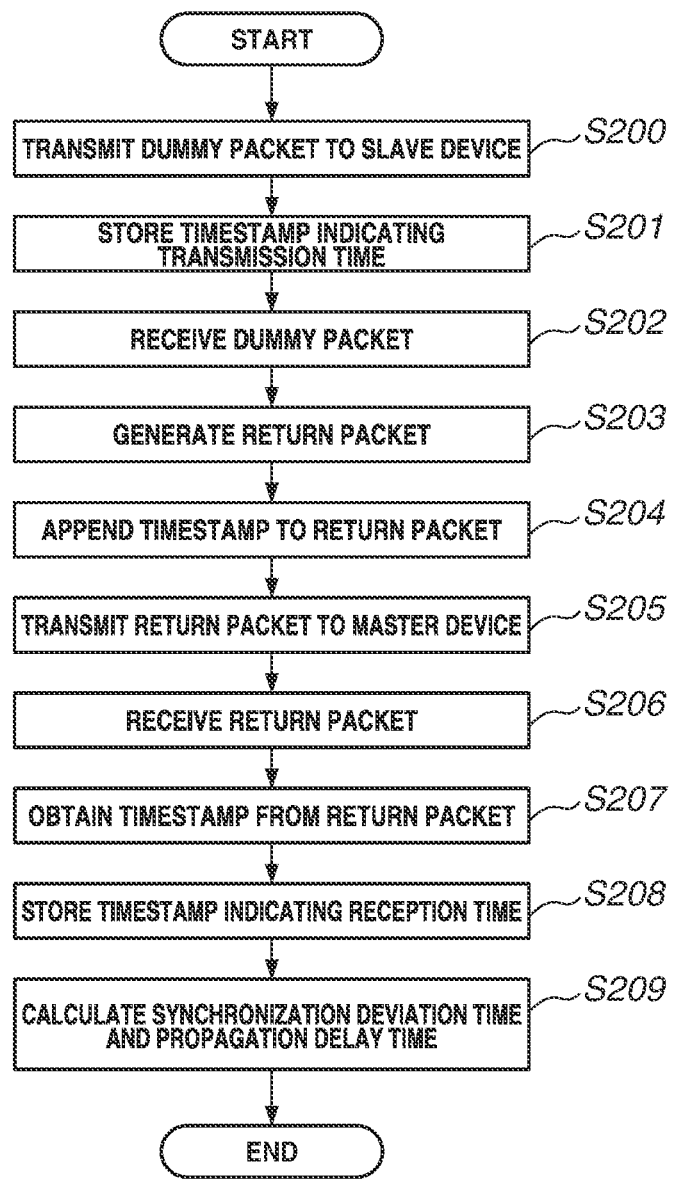
FIG. 6 is a flowchart for explaining a time synchronization process of the sensing system according to the first embodiment.
Figure 7:
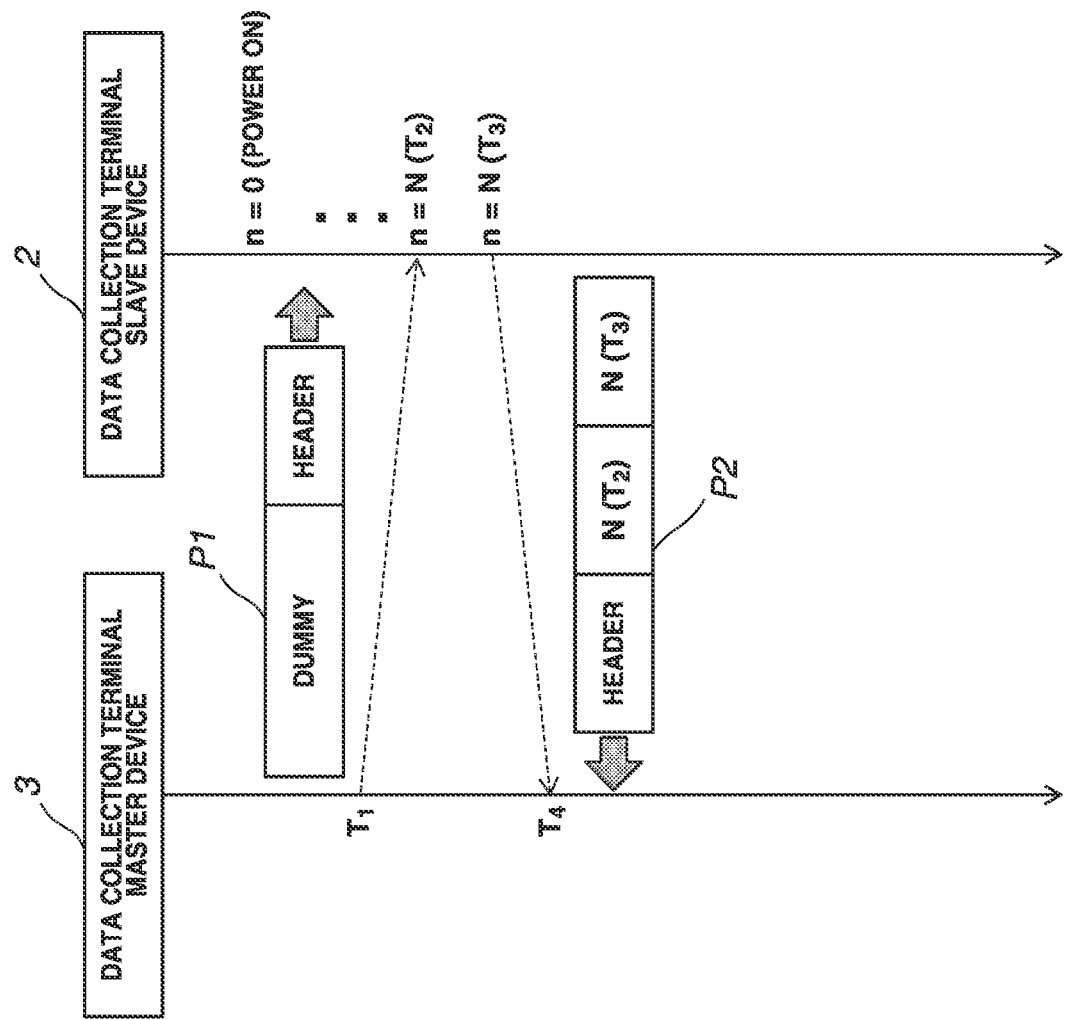
FIG. 7 is a sequence chart for explaining the time synchronization process of the sensing system according to the first embodiment.

Next, a time synchronization process of this embodiment will be explained with reference to FIGS. 6 and 7. FIG. 6 is a flowchart for explaining the time synchronization process. FIG. 7 is a sequence chart for explaining the time synchronization process.

First, the dummy packet transmission unit 38 of the data collection terminal master device 3 causes the communication circuit 30 to transmit a dummy packet P1 for time synchronization to the data collection terminal slave device 2 (step S200 of FIG. 6). Then, the dummy packet transmission unit 38 obtains time information from the clock unit 34, and stores, in the storage device 33, a timestamp $TS_1$ indicating the time at which the dummy packet P1 is transmitted to the data collection terminal slave device 2 (step S201 of FIG. 6)

When the communication circuit 21 receives the dummy packet P1 transmitted from the data collection terminal master device 3 (step S202 of FIG. 6), the return packet generation unit 27 of the data collection terminal slave device 2 obtains time information (the reception time of the dummy packet P1) from the clock unit 24, generates a return packet P2 corresponding to the dummy packet P1, obtains time information (the transmission time of the return packet P2) from the clock unit 24 (step S203 of FIG. 6), and appends, to the return packet P2, a timestamp $TS_2$ indicating the reception time of the dummy packet P1 and a timestamp $TS_3$ indicating the transmission time of the return packet P2 (step S204 of FIG. 6).

The communication processing unit 25 of the data collection terminal slave device 2 causes the communication circuit 21 to transmit the return packet P2, to which the timestamps are appended by the return packet generation unit 27, to the data collection terminal master device 3 (step S205 of FIG. 6).

When the communication circuit 30 receives the return packet P2 transmitted from the data collection terminal slave device 2 (step S206 of FIG. 6), the time calculation unit 39 of the data collection terminal master device 3 obtains the two timestamps $TS_2$ and $TS_3$ contained in the return packet P2 and temporarily stores them in the storage device 33 (step S207 of FIG. 6). Then, the time calculation unit 39 obtains time information from the clock unit 34, and stores a timestamp $TS_4$ indicating the reception time of the return packet P2 in the storage device 33 (step S208 of FIG. 6).

Subsequently, based on the transmission time of the dummy packet P1 indicated by the timestamp TS' stored in the storage device 33 in step S201, the reception time of the return packet P2 indicated by the timestamp $TS_4$ stored in the storage device 33 in step S208, and the reception time of the dummy packet P1 and the transmission time of the return packet P2 indicated by the timestamps $TS_2$ and $TS_3$ stored in the storage device 33 in step S207, the time calculation unit 39 calculates a synchronization deviation time drift of the data collection terminal master device 3 and the data collection terminal slave device 2 and a propagation delay time delay between the data collection terminal master device 3 and the data collection terminal slave device 2, and stores the calculation results in the storage device 33 (step S209 of FIG. 6).

In the example shown in FIG. 7, the time at which the data collection terminal master device 3 transmits the dummy packet P1 to the data collection terminal slave device 2 is $T_1$, the time at which the data collection terminal slave device 2 receives the dummy packet P1 is $T_2$, the time at which the data collection terminal slave device 2 transmits the return packet P2 is $T_3$, and the time at which the data collection terminal master device 3 receives the return packet P2 is $T_4$.

As described above, $T_1$ and $T_4$ are times obtained by the high-accuracy real-time clock, but $T_2$ and $T_3$ are not general unix times or NTP times but times obtained from the incremental clock for which monotonicity is ensured. That is, letting $T_{cycle}$ be the known unit time of the incremental clock of the data collection terminal slave device 2, $T_2$ and $T_3$ can be expressed as follows:

$$T_2 = T_{cycle} \times N(T_2) \quad (1)$$

$$T_3 = T_{cycle} \times N(T_3) \quad (2)$$

In equations (1) and (2), $N(T_2)$ is an integral value indicated by the timestamp $TS_2$, and $N(T_3)$ is an integral value indicated by the timestamp $TS_3$.

From an equation disclosed in non-patent literature 2, the synchronization deviation time drift of the data collection terminal master device 3 and the data collection terminal slave device 2 and the propagation delay time delay between the data collection terminal master device 3 and the data collection terminal slave device 2 can be expressed as follows:

$$\text{drift} = (T_1 + T_4)/2 - (T_2 + T_3)/2 \quad (3)$$

$$\text{delay} = (T_4 - T_1)/2 - (T_3 - T_2)/2 \quad (4)$$

Thus, the time calculation unit 39 of the data collection terminal master device 3 can estimate the synchronization deviation time drift and the propagation delay time delay from equations (1) to (4).

The data collection terminal master device 3 regularly performs the processes explained in FIGS. 6 and 7 for each data collection terminal slave device 2. Accordingly, the values of the synchronization deviation time drift and the propagation delay time delay are stored in the storage device 33 for each data collection terminal slave device 2.

Note that in this embodiment, the values of the synchronization deviation time drift and the propagation delay time delay calculated in the past can be deleted when the processes shown in FIGS. 6 and 7 are performed. In embodiments to be described later, however, it is necessary to hold the values of the synchronization deviation time drift and the propagation delay time delay calculated in the past.

Details of the operation of the corrected time calculation unit 36 of the data collection terminal master device 3 will now be explained. As described above, the values of the synchronization deviation time drift and the propagation delay time delay are stored in the storage device 33 of the data collection terminal master device 3.

Based on the data transmission time indicated by the timestamp $TS_4$ obtained from the received sensor data, the newest value of the synchronization deviation time drift calculated for the data collection terminal slave device 2 having relayed the sensor data, and the newest value of the propagation delay time delay calculated for the same data collection terminal slave device 2, the corrected time calculation unit 36 calculates the corrected data transmission time T as follows (step S107):

$$T = T_{cycle} \times N(t) + \text{drift} - \text{delay} \quad (5)$$

N(t) in equation (5) is an integral value indicated by the timestamp $TS_4$. The data collection terminal master device 3 performs the process shown in FIG. 5 for each sensor 1 and each data collection terminal slave device 2. Note that in order to perform the processes in steps S107 and S108, it is, of course, necessary to perform the processes shown in FIGS. 6 and 7 at least once before the data collection terminal master device 3 receives sensor data.

As described above, this embodiment can accurately synchronize the transmission times of sensor data from a plurality of sensors 1. That is, accurate synchronized sampling is possible even when the computation performance and the clock accuracy of the data collection terminal slave device 2 are low.

Second Embodiment

The second embodiment of the present invention will be explained below. This embodiment is a sensing system having the feature that the size of a dummy packet P1 to be transmitted from a data collection terminal master device 3 to a data collection terminal slave device 2, the size of a return packet P2 to be transmitted from the data collection terminal slave device 2 to the data collection terminal master device 3, and the size of a sensor data packet to be transferred from the data collection terminal slave device 2 to the data collection terminal master device 3 are equal, in the first embodiment.

In the present invention, if the sizes of packets to be exchanged between the data collection terminal master device 3 and the data collection terminal slave device 2 are different, a propagation delay time delay calculated in the first embodiment produces a difference. Since ½ of this difference of the propagation delay time delay causes a systematic time synchronization error in the calculation, the packet sizes of communication between the data collection terminal master device 3 and the data collection terminal slave device 2 must be equalized. Time synchronization more accurate than the first embodiment can be performed by equalizing the packet sizes. The rest of the configuration is the same as explained in the first embodiment.

Third Embodiment

The third embodiment of the present invention will be explained below. This embodiment is a sensing system having the feature that a data collection terminal master device 3 corrects an error by performing a process of calculating a synchronization deviation time drift and a propagation delay time delay a plurality of times, in the first and second embodiments. In this embodiment, the overall arrangement of the sensing system and the arrangements of a sensor 1 and a data collection terminal slave device 2 are the same as the first and second embodiments, so an explanation will be made by using the reference numerals shown in FIGS. 1 to 3.

Figure 8:
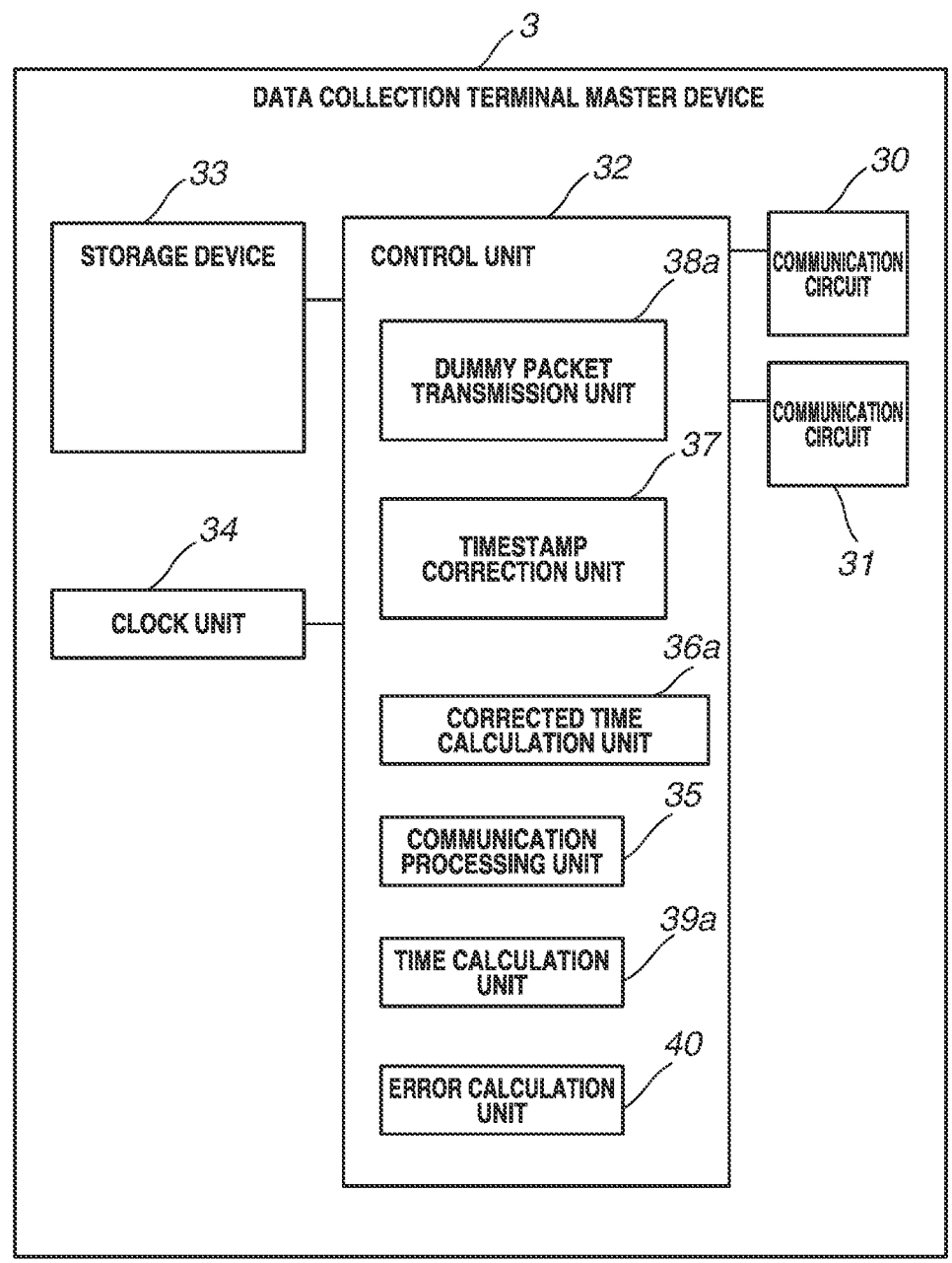
FIG. 8 is a block diagram showing the arrangement of a data collection terminal master device of a sensing system according to the third embodiment of the present invention.

FIG. 8 is a block diagram showing the arrangement of the data collection terminal master device 3 of this embodiment. A control unit 32 of the data collection terminal master device 3 of this embodiment includes a communication processing unit 35, a corrected time calculation unit 36a, a timestamp correction unit 37, a dummy packet transmission unit 38a, a time calculation unit 39a, and an error calculation unit 40 for calculating an error of the synchronization deviation time drift.

This embodiment aims to reduce timing errors of the synchronization deviation time drift and the propagation delay time delay by performing sampling a plurality of times. These errors generally follow a normal distribution, except for a long packet delay due to retransmission or the like. That is, the dispersion of this normal distribution can be reduced to √N by performing a sampling operation N times. In addition, a low-performance clock generator often has an error in the period itself. In this case, the times gradually deviate if the process of calculating the synchronization deviation time drift and the propagation delay time delay is performed only once. Therefore, this embodiment obtains an error of the synchronization deviation time drift by performing the process of calculating the synchronization deviation time drift a plurality of times.

Figure 9:
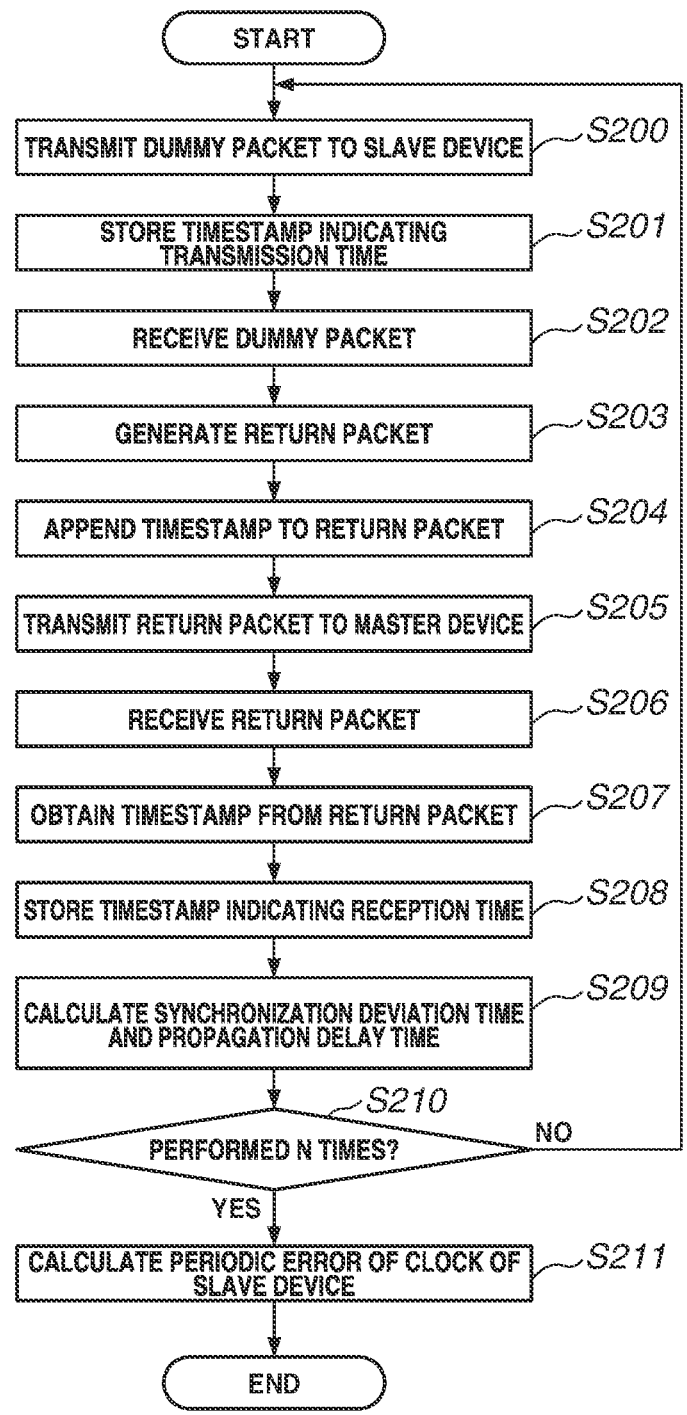
FIG. 9 is a flowchart for explaining a time synchronization process of the sensing system according to the third embodiment of the present invention.

FIG. 9 is a flowchart for explaining the time synchronization process of this embodiment. The dummy packet transmission unit 38a and the time calculation unit 39a of the data collection terminal master device 3 of this embodiment perform the same processes as the dummy packet transmission unit 38 and the time calculation unit 39 of the first embodiment. The difference from the first embodiment is to perform the processes in steps S200 to S209 N times (N is an integer of 2 or more). In this case, the synchronization deviation time drift and the propagation delay time delay are calculated N times, and all these values are stored in a storage device 33.

After the processes in steps S200 to S209 are performed N times (YES in step S210 of FIG. 9), the error calculation unit 40 of the data collection terminal master device 3 calculates a periodic error of the clock of the data collection terminal slave device 2 (step S211 of FIG. 9).

When the process of calculating the synchronization deviation time drift and the propagation delay time delay is performed once, the relationship between the calculated synchronization deviation time drift and time $T_C$ of the data collection terminal master device 3 when the synchronization deviation time drift is calculated can be expressed as follows:

$$\text{drift} = a(T_c - T_0) + b \qquad (6)$$

In equation (6), $T_0$ is the time of the data collection terminal master device 3 in the first calculation process, $\underline{a}$ is the periodic error of the clock of the data collection terminal slave device 2, and b is the error of the synchronization deviation time drift in the first calculation process. The times $T_c$ and $T_0$ can be obtained from a clock unit 34. Accordingly, it is possible, by performing the processes in steps S200 to S209 N times, to obtain $T_0$ of the first calculation process, the N values of the synchronization deviation time drift, and the N values of $T_c$ when the N values of the synchronization deviation time drift are calculated. The error calculation unit 40 can estimate the values of $\underline{a}$ and b by the least square method by using $T_0$, drift, and $T_C$. The error calculation unit 40 stores the calculated values of $\underline{a}$ and b in the storage device 33. The data collection terminal master device 3 regularly performs the above processing explained with reference to FIG. 9 for each data collection terminal slave device 2.

Figure 10:
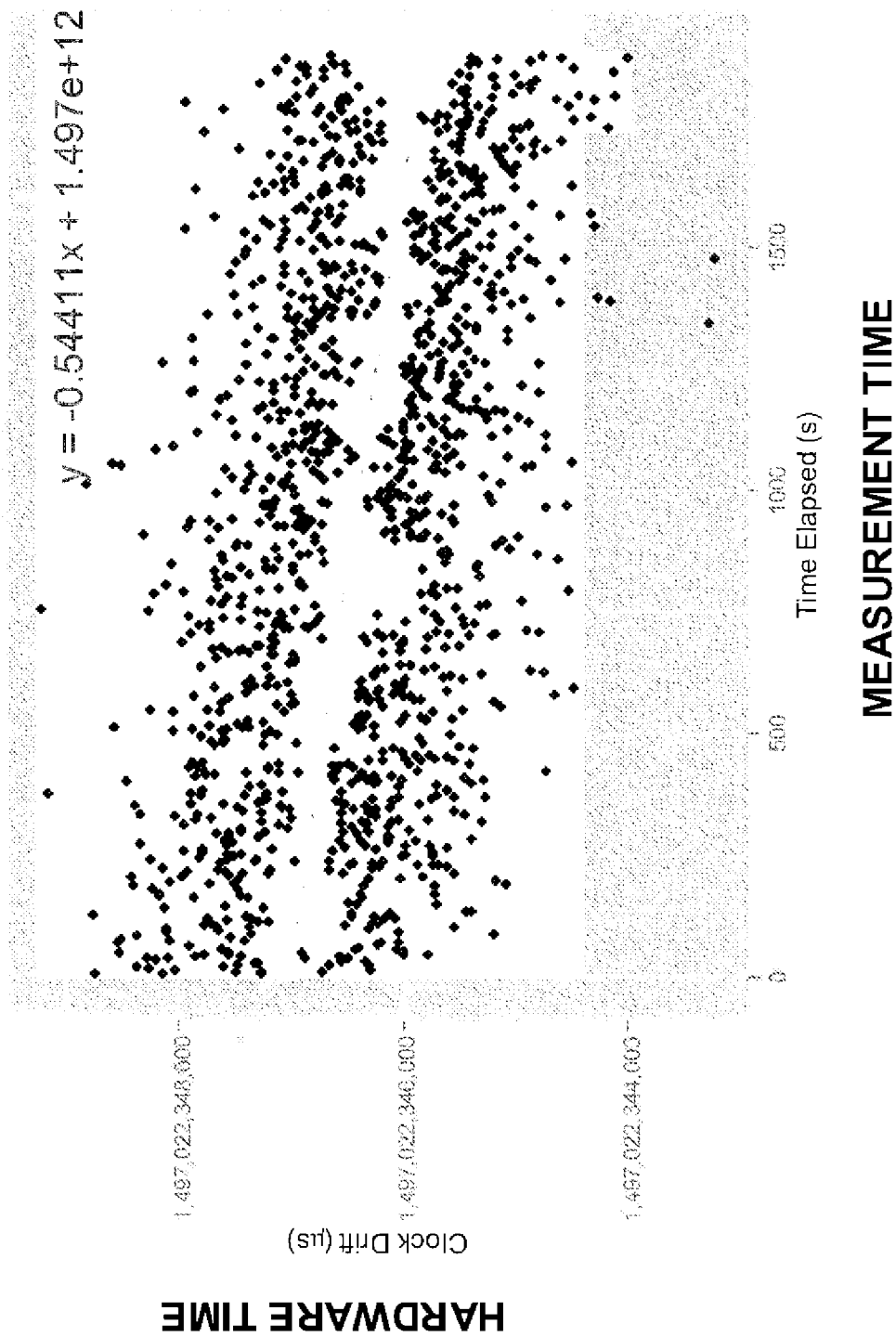
FIG. 10 is a graph showing the results of the calculation of a synchronization deviation time of the data collection terminal master device and a data collection terminal slave device in the third embodiment of the present invention.

FIG. 10 is a graph showing the results of the calculation of the synchronization deviation time drift obtained by performing the processes in steps S200 to S209 once for every 1 sec in this embodiment. When the speed of the clock of the data collection terminal master device 3 and that of the clock of the data collection terminal slave device 2 completely match, the synchronization deviation time drift remains unchanged because an initially produced slope of drift except for an error becomes 0.

In the example shown in FIG. 10, however, letting y (μs) be the calculated synchronization deviation time drift and x (sec) be the measurement time, $y = -0.54411x + 1.497 \times 10^{12}$ holds, and this shows that the time of the data collection terminal slave device 2 gains 0.5 μs for every 1 sec. That is, it is possible to determine that a difference is produced between the speed of the clock of the data collection terminal master device 3 and that of the clock of the data collection terminal slave device 2, so the data collection terminal master device 3 can correct the timestamp of the sensor data based on the speed difference.

Figure 11:
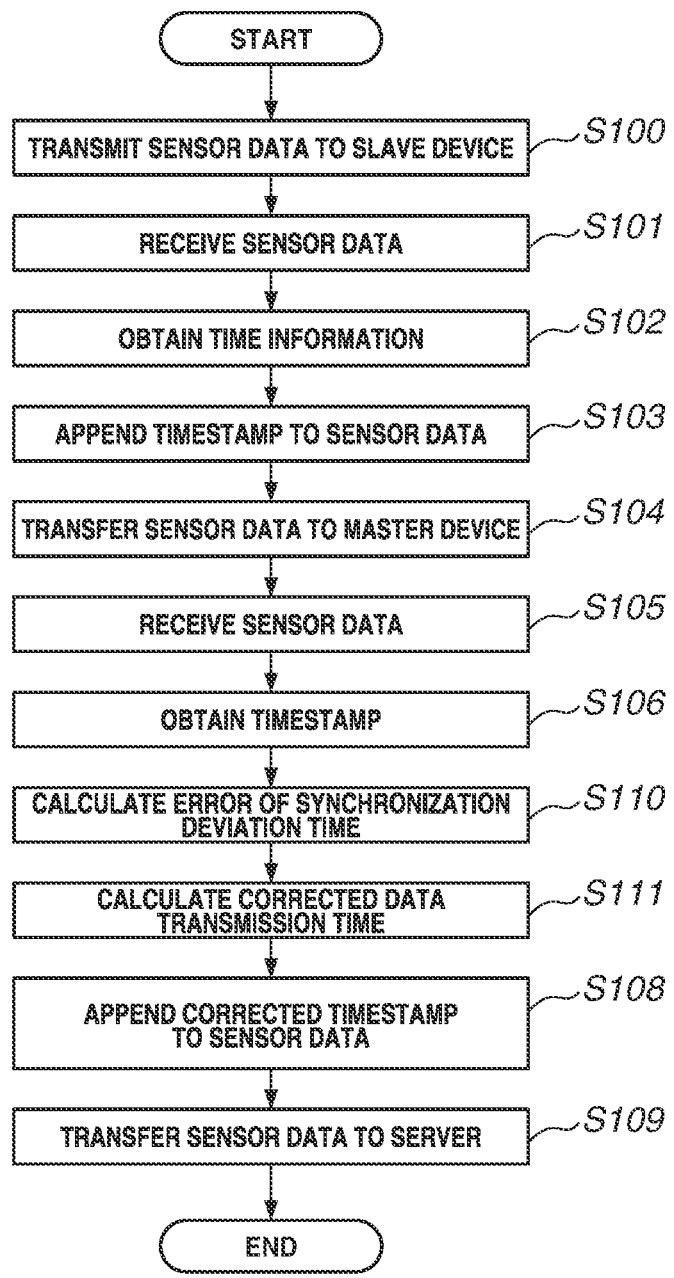
FIG. 11 is a flowchart for explaining a sensor data transfer process of the sensing system according to the third embodiment of the present invention.

A practical correction method will be explained. FIG. 11 is a flowchart for explaining a sensor data transfer process of this embodiment. Processes in steps S100 to S106 of FIG. 11 are the same as explained in the first embodiment.

Before calculating corrected data transmission time T, the corrected time calculation unit 36a of the data collection terminal master device 3 of this embodiment calculates an error $e_{drift}$ of the synchronization deviation time drift (step S110 of FIG. 11). More specifically, when calculating the corrected data transmission time T in response to the reception of sensor data in step S105, the corrected time calculation unit 36a calculates the error $e_{drift}$ of the synchronization deviation time drift as follows, based on time $T_d$ of the data collection terminal master device 3 obtained from the time information of the clock unit 34, and the clock periodic error a calculated for the data collection terminal slave device 2 having relayed the sensor data:

$$e_{drift} = a \times T_d \quad (7)$$

Then, based on the data transmission time indicated by a timestamp $TS_A$ obtained from the received sensor data, the newest value of the synchronization deviation time drift calculated for the data collection terminal slave device 2 having relayed the sensor data, the newest value of the propagation delay time delay calculated for the same data collection terminal slave device 2, and the error $e_{drift}$ of the synchronization deviation time drift calculated in step S110, the corrected value calculation unit 36a calculates the corrected data transmission time T as follows (step S111 of FIG. 11):

$$T = T_{cycle} \times N(t) + \text{drift} - \text{delay} - e_{drift} \quad (8)$$

Processes in steps S108 and S109 of FIG. 11 are the same as explained in the first embodiment. In this embodiment, therefore, the data collection terminal master device 3 corrects the timestamp of sensor data in accordance with the error $e_{drift}$ of the synchronization deviation time drift. This can further increase the accuracy of time synchronization.

Fourth Embodiment

The fourth embodiment of the present invention will be explained below. This embodiment is a sensing system having the feature that a time synchronization target is extended to an end sensor, in the first to third embodiments. In this embodiment, the overall configuration of the sensing system and the arrangements of a data collection terminal slave device 2 and a data collection terminal master device 3 are the same as in the first and second embodiments, so an explanation will be made by using the reference numerals shown in FIGS. 1, 3, and 4.

Figure 12:
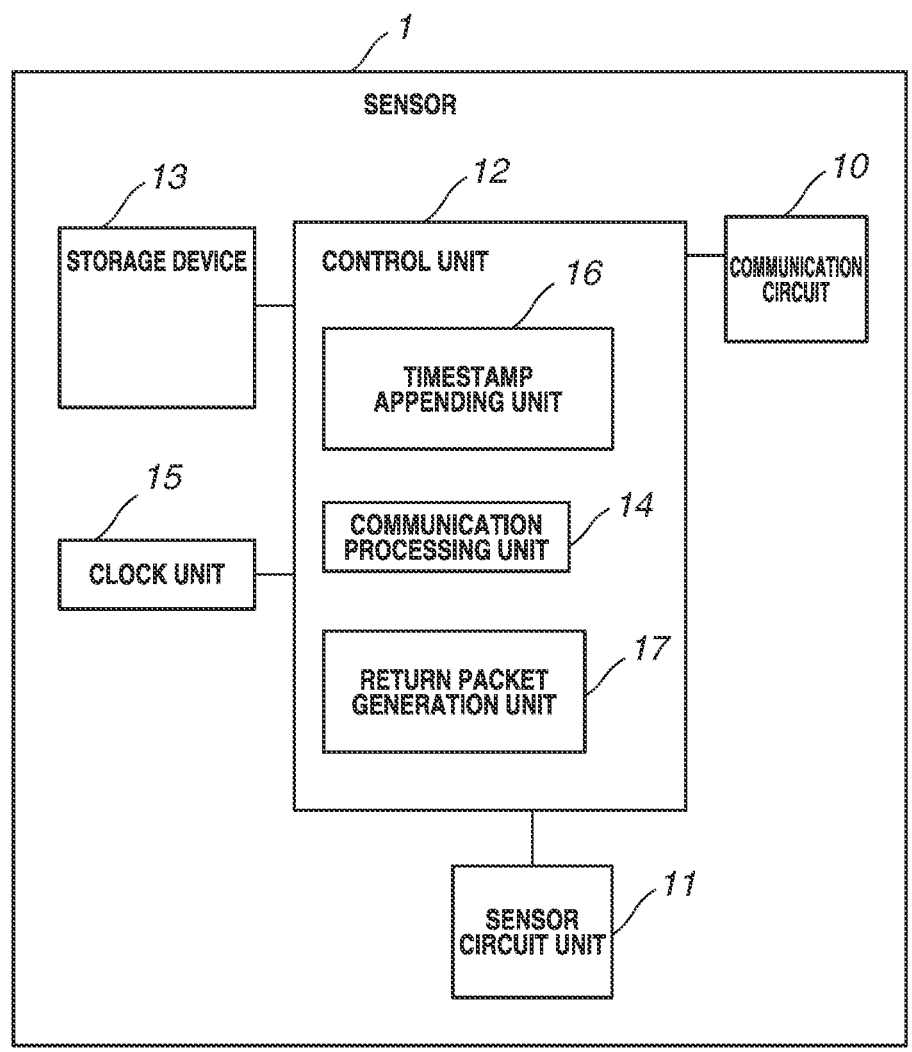
FIG. 12 is a block diagram showing the arrangement of a sensor of a sensing system according to the fourth embodiment of the present invention.

FIG. 12 is a block diagram showing the arrangement of a sensor 1 of this embodiment. The sensor 1 of this embodiment includes a communication circuit 10, a sensor circuit unit 11, a control unit 12, a storage device 13, and a clock unit 15. The control unit 12 includes a communication processing unit 14, a timestamp appending unit 16, and a return packet generation unit 17.

As explained in the first embodiment, the sensor 1 can be implemented by a computer including a CPU, a storage device, and an interface, and programs for controlling these hardware resources. Like a clock unit 24 of the data collection terminal slave device 2, time information to be output from the clock unit 15 is the clock counting result, i.e., an integral value.

Figure 13:
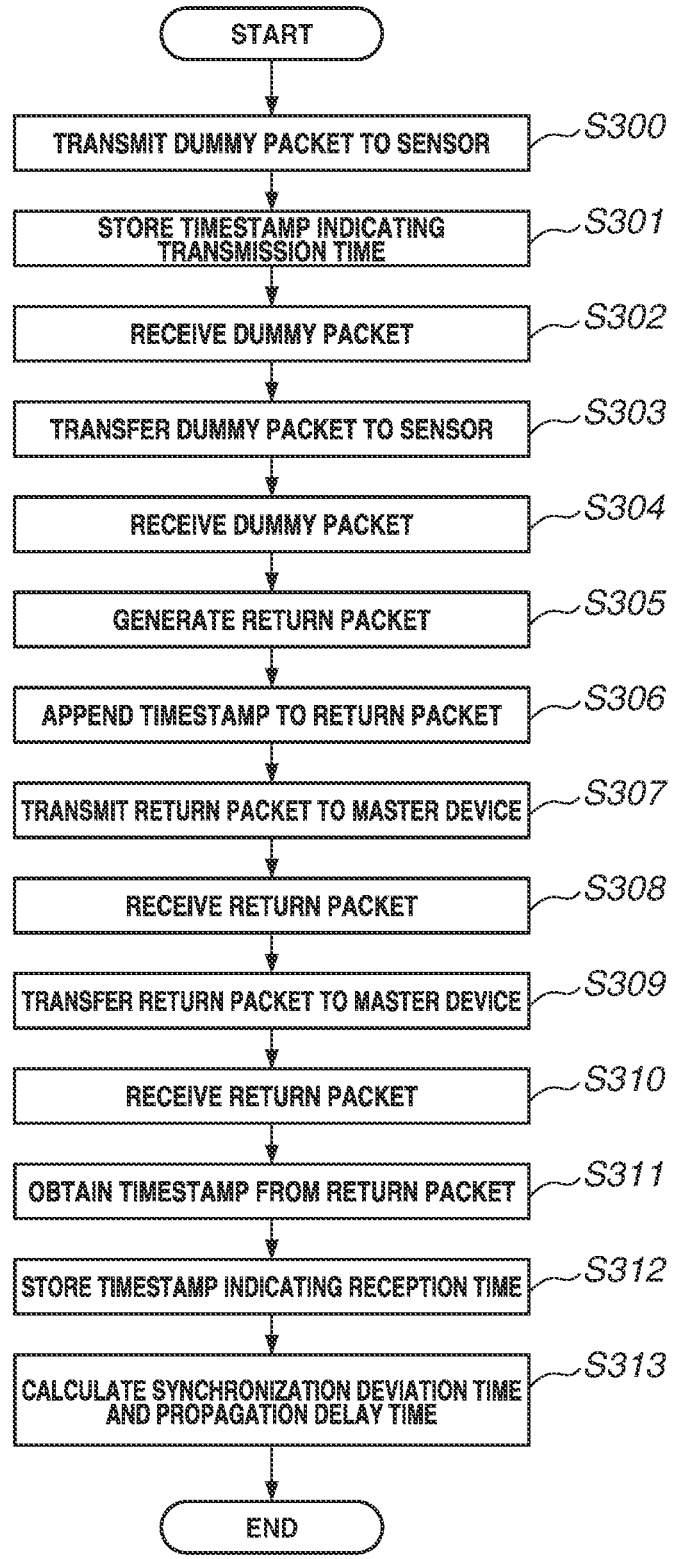
FIG. 13 is a flowchart for explaining a time synchronization process of the sensing system according to the fourth embodiment of the present invention.
Figure 14:
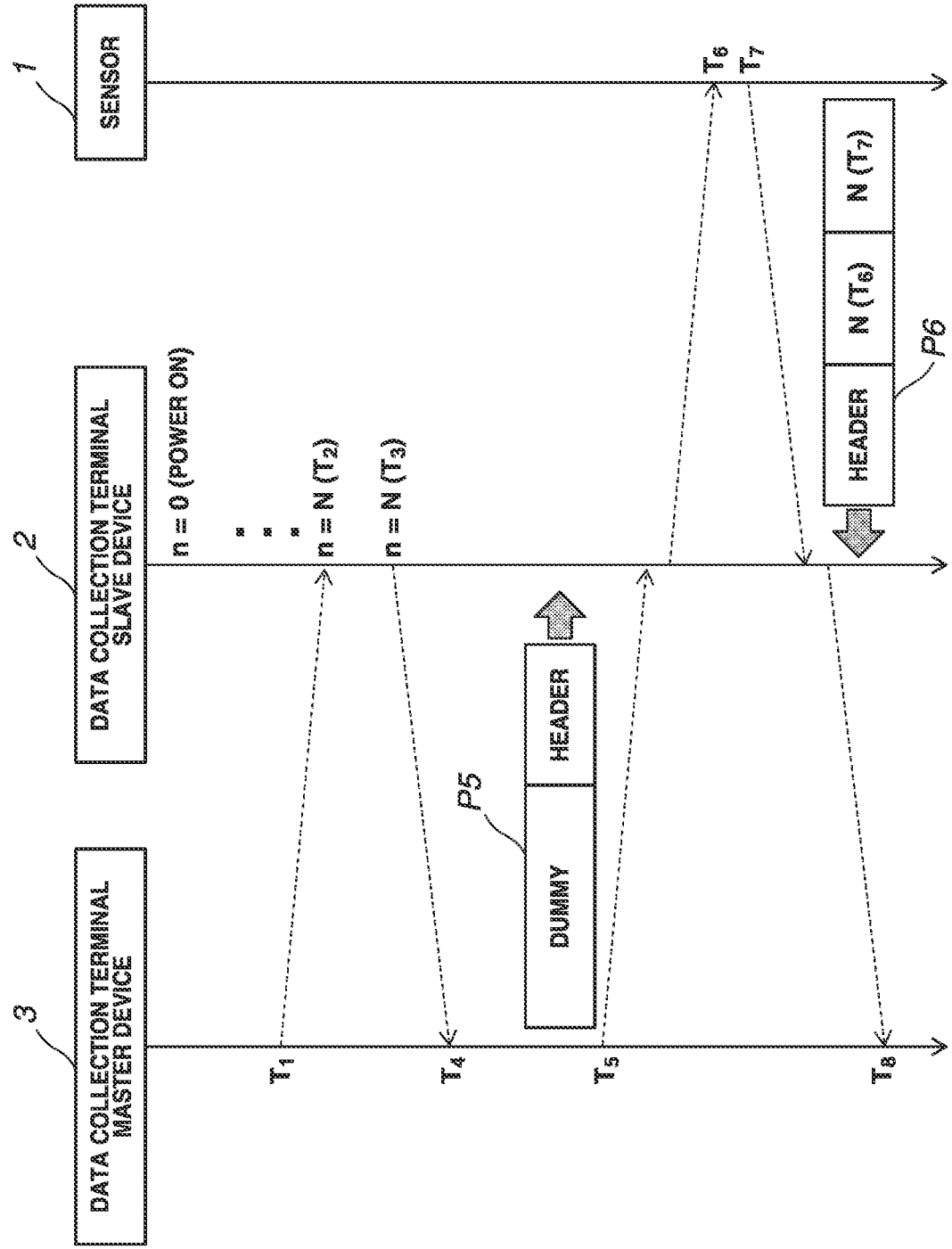
FIG. 14 is a sequence chart for explaining the time synchronization process of the sensing system according to the fourth embodiment of the present invention.

A time synchronization process of this embodiment will be explained with reference to FIGS. 13 and 14. FIG. 13 is a flowchart for explaining the time synchronization process. FIG. 14 is a sequence chart for explaining the time synchronization process.

First, a dummy packet transmission unit 38 of the data collection terminal master device 3 causes a communication circuit 30 to transmit a dummy packet P5 for time synchronization to the sensor 1 (step S300 of FIG. 13). Then, the dummy packet transmission unit 38 obtains time information from a clock unit 34, and stores, in a storage device 33, a timestamp $TS_5$ indicating the time at which the dummy packet P5 is transmitted to the sensor 1 (step S301 of FIG. 13).

When a communication circuit 21 receives the dummy packet P5 transmitted from the data collection terminal master device 3 (step S302 of FIG. 13), a communication processing unit 25 of the data collection terminal slave device 2 causes a communication circuit 20 to transfer the dummy packet P5 to the sensor 1 (step S303 of FIG. 13).

When the communication unit 10 receives the dummy packet P5 transmitted from the data collection terminal master device 3 via the data collection terminal slave device 2 (step S304 of FIG. 13), the return packet generation unit 17 of the sensor 1 generates a return packet P6 corresponding to the dummy packet P5 (step S305 of FIG. 13), and appends, to the return packet P6, a timestamp $TS_6$ indicating the reception time of the dummy packet P5 and a timestamp $TS_7$ indicating the transmission time of the return packet P6 (step S306 of FIG. 13).

The communication processing unit 14 of the sensor 1 causes the communication circuit 10 to transmit the return packet P6, to which the timestamps are appended by the return packet generation unit 17, to the data collection terminal master device 3 (step S307 of FIG. 13).

When the communication circuit 20 receives the return packet P6 transmitted from the sensor 1 (step S308 of FIG. 13), the communication processing unit 25 of the data collection terminal slave device 2 causes the communication circuit 21 to transfer the return packet P6 to the data collection terminal master device 3 (step S309 of FIG. 13).

When the communication circuit 30 receives the return packet P6 transmitted from the sensor 1 via the data collection terminal slave device 2 (step S310 of FIG. 13), a time calculation unit 39 of the data collection terminal master device 3 obtains the two timestamps $TS_6$ and $TS_7$ contained in the return packet P6 and temporarily stores them in the storage device 33 (step S311 of FIG. 13). Then, the time calculation unit 39 obtains time information from the clock unit 34, and stores a timestamp $TS_8$ indicating the reception time of the return packet P6 in the storage device 33 (step S312 of FIG. 13).

Subsequently, based on the transmission time of the dummy packet P5 indicated by the timestamp $TS_5$ stored in the storage device 33 in step S301, the reception time of the return packet P6 indicated by the timestamp $TS_8$ stored in the storage device 33 in step S312, and the reception time of the dummy packet P5 and the transmission time of the return packet P6 indicated by the timestamps $TS_6$ and $TS_7$ stored in the storage device 33 in step S311, the time calculation unit 39 calculates a synchronization deviation time drift' of the data collection terminal master device 3 and the sensor 1 and a propagation delay time delay' between the data collection terminal master device 3 and the sensor 1, and stores the calculation results in the storage device 33 (step S313 of FIG. 13).

In the example shown in FIG. 14, the time at which the data collection terminal master device 3 transmits the dummy packet P5 to the sensor 1 is $T_5$, the time at which the sensor 1 receives the dummy packet P5 is $T_6$, the time at which the sensor 1 transmits the return packet P6 is $T_7$, and the time at which the data collection terminal master device 3 receives the return packet P6 is $T_8$.

As in the first embodiment, $T_5$ and $T_8$ are times obtained by the high-accuracy real-time clock, but $T_6$ and $T_7$ are times obtained by the incremental clock having ensured monotonicity. Letting $T'_{cycle}$ be the known unit time of the incremental clock of the sensor 1, $T_6$ and $T_7$ can be expressed as follows:

$$T_6 = T'_{cycle} \times N(T_6) \quad (9)$$

$$T_7 = T'_{cycle} \times N(T_7) \quad (10)$$

In equations (9) and (10), N(T$_6$) is an integral value indicated by the timestamp TS$_6$, and N(T$_7$) is an integral value indicated by the timestamp TS$_7$.

The synchronization deviation time drift' of the data collection terminal master device 3 and the sensor 1 and the propagation delay time delay' between the data collection terminal master device 3 and the sensor 1 can be expressed as follows:

$$\text{drift}'=(T_5+T_8)/2-(T_6+T_7)/2 \quad (11)$$

$$\text{delay}'=(T_8-T_5)/2-(T_7-T_6)/2 \quad (12)$$

Thus, the time calculation unit 39 of the data collection terminal master device 3 can estimate the synchronization deviation time drift' and the propagation delay time delay' from equations (9) to (12). The data collection terminal master device 3 regularly performs the processes explained in FIGS. 13 and 14 for each sensor 1. Accordingly, the values of the synchronization deviation time drift' and the propagation delay time delay' are stored in the storage device 33 for each sensor 1.

A sensor data transfer process of this embodiment will be explained with reference to FIG. 15. When transmitting sensor data (a packet) containing information of a physical amount measured by the sensor circuit unit 11 and a unique sensor ID prestored in the storage device 13, the timestamp appending unit 16 of each sensor 1 obtains time information (an integral value) from the clock 15 (step S400 of FIG. 15), and appends a timestamp TS$_C$ indicating this time information to the sensor data.

Figure 15:
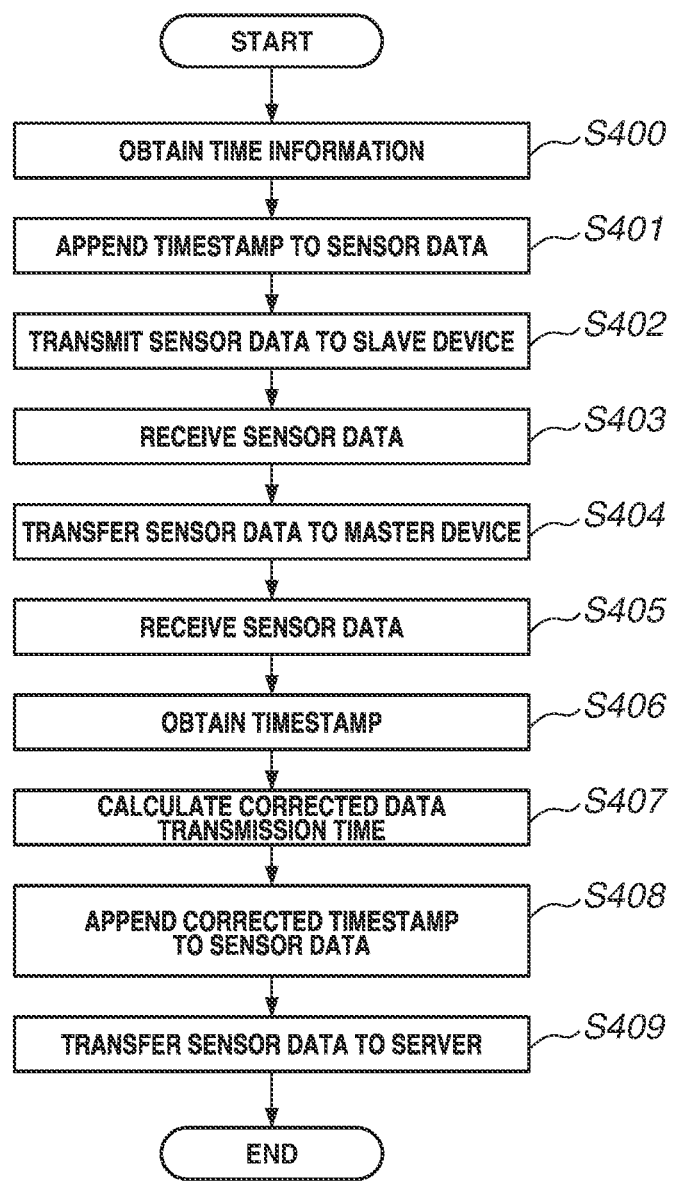
FIG. 15 is a flowchart for explaining a sensor data transfer process of the sensing system according to the fourth embodiment of the present invention.

Then, the communication processing unit 14 of the sensor 1 causes the communication circuit 10 to transmit the sensor data to which the timestamp TS$_C$ is appended (a sensor data packet containing the sensor data and the timestamp TS$_C$) (step S402 of FIG. 15).

When the communication circuit 20 receives the sensor data packet transmitted from the sensor 1 (step S403 of FIG. 15), the communication processing unit 25 of the data collection terminal slave device 2 causes the communication circuit 21 to transfer the sensor data packet to the data collection terminal master device 3 (step S404 of FIG. 15).

When the communication circuit 30 receives the sensor data packet transmitted from the data collection terminal slave device 2 (step S405 of FIG. 15), a corrected time calculation unit 36 of the data collection terminal master device 3 obtains the timestamp TS$_C$ contained in the sensor data packet (step S406 of FIG. 15), and calculates corrected data transmission time T as follows, based on the data transmission time indicated by the obtained timestamp TS$_C$, the newest value of the synchronization deviation time drift' calculated for the sensor 1 having transmitted the sensor data, and the newest value of the propagation delay time delay' calculated for the same sensor 1 (step S407 of FIG. 15):

$$T=T'_{cycle} \times N(t)+\text{drift}'-\text{delay}' \quad (13)$$

N'(t) in equation (5) is an integral value indicated by the timestamp TS$_C$. A timestamp correction unit 37 of the data collection terminal master device 3 appends a timestamp T$_D$ indicating the data transmission time T calculated by the corrected time calculation unit 36 to the sensor data received by the communication circuit 30 (step S408 of FIG. 15).

Then, a communication processing unit 35 of the data collection terminal master device 3 causes a communication circuit 31 to transfer the sensor data, to which the timestamp TS$_D$ is appended (a sensor data packet containing the sensor data and the timestamp TS$_D$), to the server of a higher-level network 4 (step S409 of FIG. 15). It is thus possible to correct the time of data transmission from the sensor 1 to the data collection terminal master device 3, and transfer the sensor data to the server.

In this embodiment, timing synchronization can be performed up to the sensor 1, and this makes it possible to calculate the time by a simple timestamp appended to sensor data by the sensor 1. That is, in this embodiment, it is possible to record a timestamp at the moment the CPU of the sensor 1 reads the output from the sensor circuit unit 11 in the sensor 1.

In the first embodiment, the data collection terminal slave device 2 appends a timestamp to sensor data, so it is impossible to compensate for the communication delay time between the sensor 1 and the data collection terminal slave device 2. In this embodiment, however, the sensor 1 itself appends a timestamp to sensor data. This is very effective when highly accurate time synchronization is necessary.

Fifth Embodiment

In the fourth embodiment, the same processing as in the first embodiment is performed on the sensor 1. However, the present invention is not limited to this, and the same processing as in the third embodiment may also be performed on the sensor 1. In this embodiment, the arrangement of a sensor 1 is the same as the fourth embodiment, the arrangement of a data collection terminal slave device 2 is the same as the first to fourth embodiments, and the arrangement of a data collection terminal master device 3 is the same as the third embodiment, so an explanation will be made by using the reference numerals shown in FIGS. 1, 3, 8, and 12.

Figure 16:
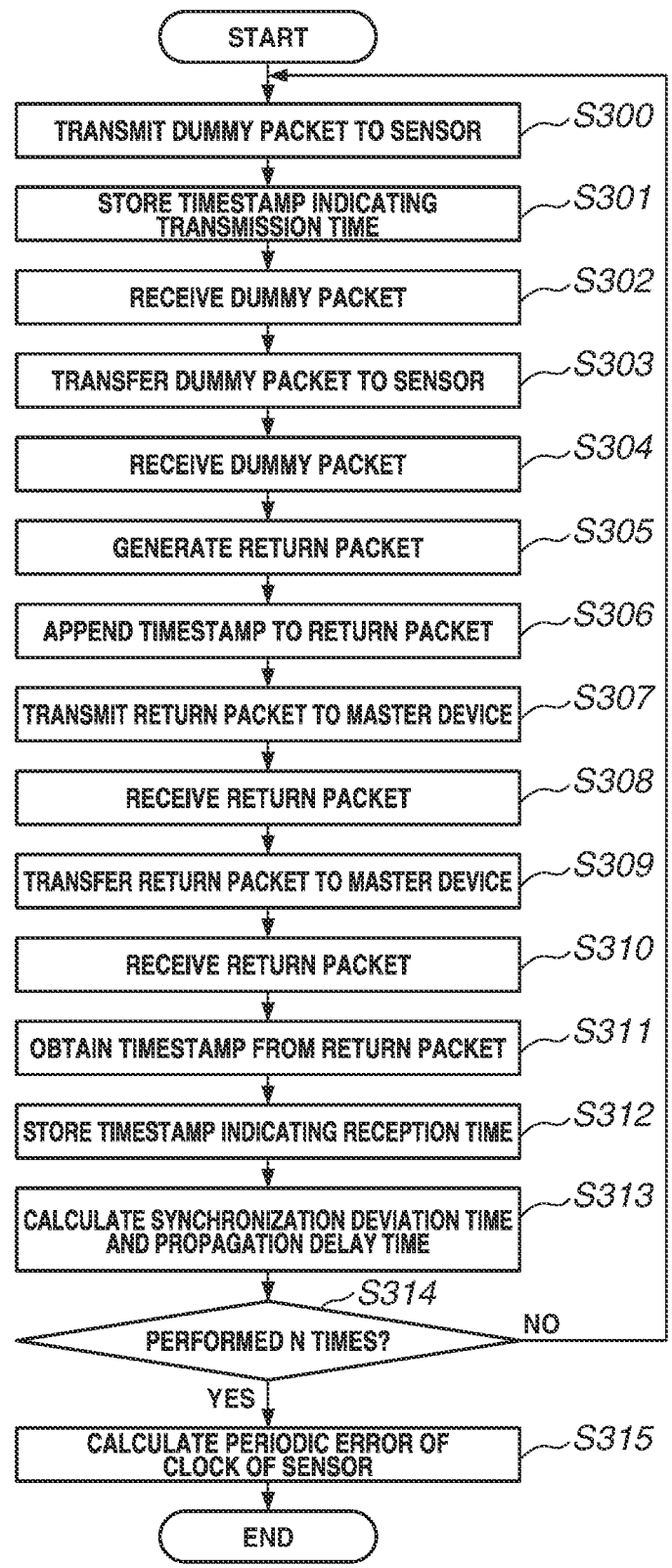
FIG. 16 is a flowchart for explaining a time synchronization process of a sensing system according to the fifth embodiment of the present invention.

FIG. 16 is a flowchart for explaining a time synchronization process of this embodiment. A dummy packet transmission unit 38a and a time calculation unit 39a of the data collection terminal master device 3 of this embodiment perform the same processes as the dummy packet transmission unit 38 and the time calculation unit 39 of the fourth embodiment. The difference from the fourth embodiment is that the processes in steps S300 to S313 are performed N times. In this case, a synchronization deviation time drift' and a propagation delay time delay' are calculated N times, and all these values are stored in a storage device 33.

After the processes in steps S300 to S313 are performed N times (YES in step S314 of FIG. 16), an error calculation unit 40 of the data collection terminal master device 3 calculates a periodic error of the clock of the sensor 1 (step S315 of FIG. 16).

When the process of calculating the synchronization deviation time drift' and the propagation delay time delay' is performed once, the relationship between the calculated synchronization deviation time drift' and time T$_C$ of the data collection terminal master device 3 when the synchronization deviation time drift' is calculated can be expressed as follows in the same manner as equation (6):

$$\text{drift}'=g(T_c-T_0)+h \quad (14)$$

In equation (14), T$_0$ is the time of the data collection terminal master device 3 in the first calculation process, g is the periodic error of the clock of the sensor 1, and h is an error of the synchronization deviation time drift' in the first calculation process. When the processes in steps S300 to S313 are performed N times, therefore, it is possible to obtain T$_0$ in the first calculation process, the N values of the synchronization deviation time drift', and the N values of T$_C$ when these values of the synchronization deviation time drift' are calculated. The error calculation unit 40 can estimate the values of g and h by the least square method by using these values of $T_0$, drift, and $T_C$. The error calculation unit 40 stores the calculated values of g and h in the storage device 33. The data collection terminal master device 3 regularly performs the processing explained in FIG. 16 for each sensor 1.

Figure 17:
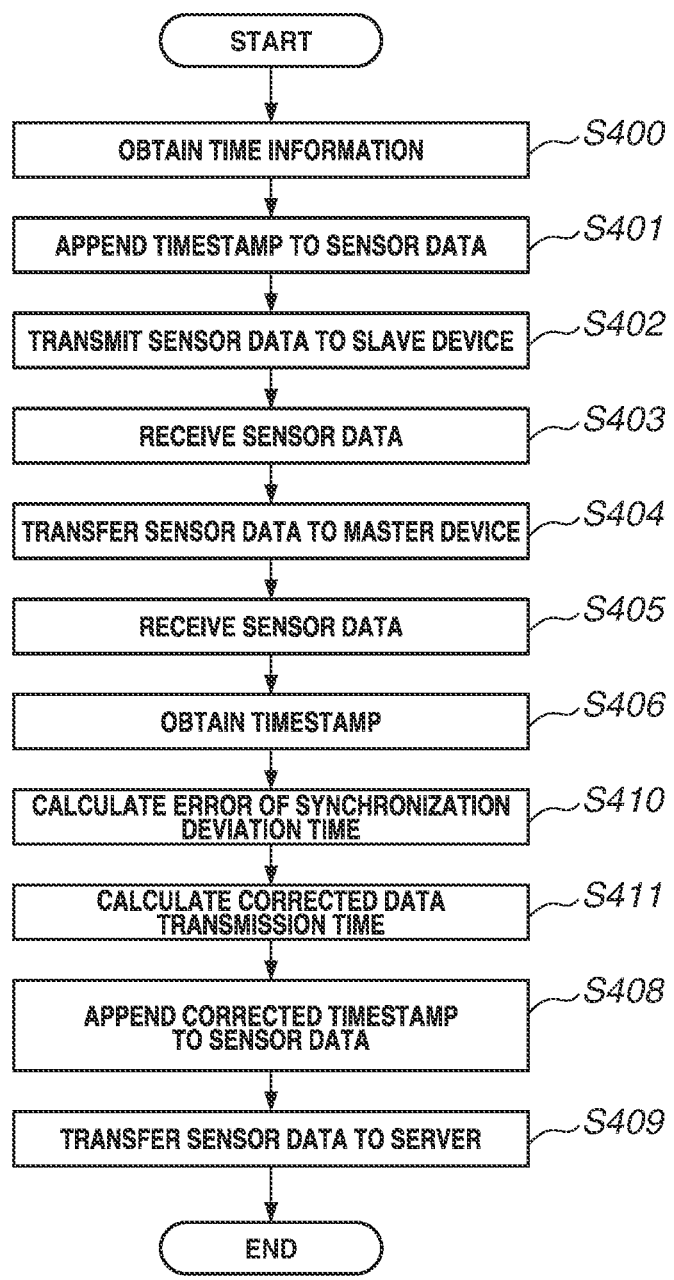
FIG. 17 is a flowchart for explaining a sensor data transfer process of the sensing system according to the fifth embodiment of the present invention.

FIG. 17 is a flowchart for explaining a sensor data transfer process of this embodiment. Processes in steps S400 to S406 of FIG. 17 are the same as explained in the fourth embodiment.

Before calculating corrected data transmission time T, a corrected time calculation unit 36a of the data collection terminal master device 3 of this embodiment calculates an error e'$_{drift}$ of the synchronization deviation time drift' (step S410 of FIG. 17). More specifically, when calculating the corrected data transmission time T in response to the reception of sensor data in step S405, the corrected time calculation unit 36a calculates the error e'$_{drift}$ of the synchronization deviation time drift' as follows, based on time $T_d$ of the data collection terminal master device 3 obtained from time information of a clock unit 34, and the periodic error g of the clock calculated for the sensor 1 having transmitted the sensor data:

$$e'_{drift} = g \times T_d \quad (15)$$

Then, based on data transmission time indicated by a timestamp $TS_C$ obtained from the received sensor data, the newest value of the synchronization deviation time drift' calculated for the sensor 1 having transmitted the sensor data, the newest value of the propagation delay time delay' calculated for the same sensor 1, and the error e'$_{drift}$ of the synchronization deviation time drift' calculated in step S410, the corrected time calculation unit 36a calculates the corrected data transmission time T as follows (step S411 of FIG. 17):

$$T = T'_{cycle} \times N'(t) + \text{drift}' - \text{delay}' - e'_{drift} \quad (16)$$

Processes in steps S408 and S409 of FIG. 17 are the same as the fourth embodiment. In this embodiment as described above, the data collection terminal master device 3 corrects a timestamp of sensor data based on the error e'$_{drift}$ of the synchronization deviation time drift'. This can further increase the accuracy of time synchronization.

Note that more accurate time synchronization can be performed by applying the second embodiment to the fourth and fifth embodiments. That is, it is only necessary to equalize the size of a dummy packet P5 to be transmitted from the data collection terminal master device 3 to the sensor 1, the size of a return packet P6 to be transmitted from the sensor 1 to the data collection terminal master device 3, and the size of a sensor data packet to be transmitted from the sensor 1 to the data collection terminal master device 3.

Sixth Embodiment

The sixth embodiment of the present invention will be explained below. This embodiment is a sensing system having the feature that a data collection terminal master device 3 has a function of transmitting a time synchronization calculation result to a data collection terminal slave device 2, and the data collection terminal slave device 2 has a function of correcting time upon receiving the time synchronization calculation result, in the first to third embodiments. In this embodiment, the overall configuration of the sensing system and the arrangement of a sensor 1 are the same as the first to third embodiments, so an explanation will be made by using the reference numerals shown in FIGS. 1 and 2.

Figure 18:
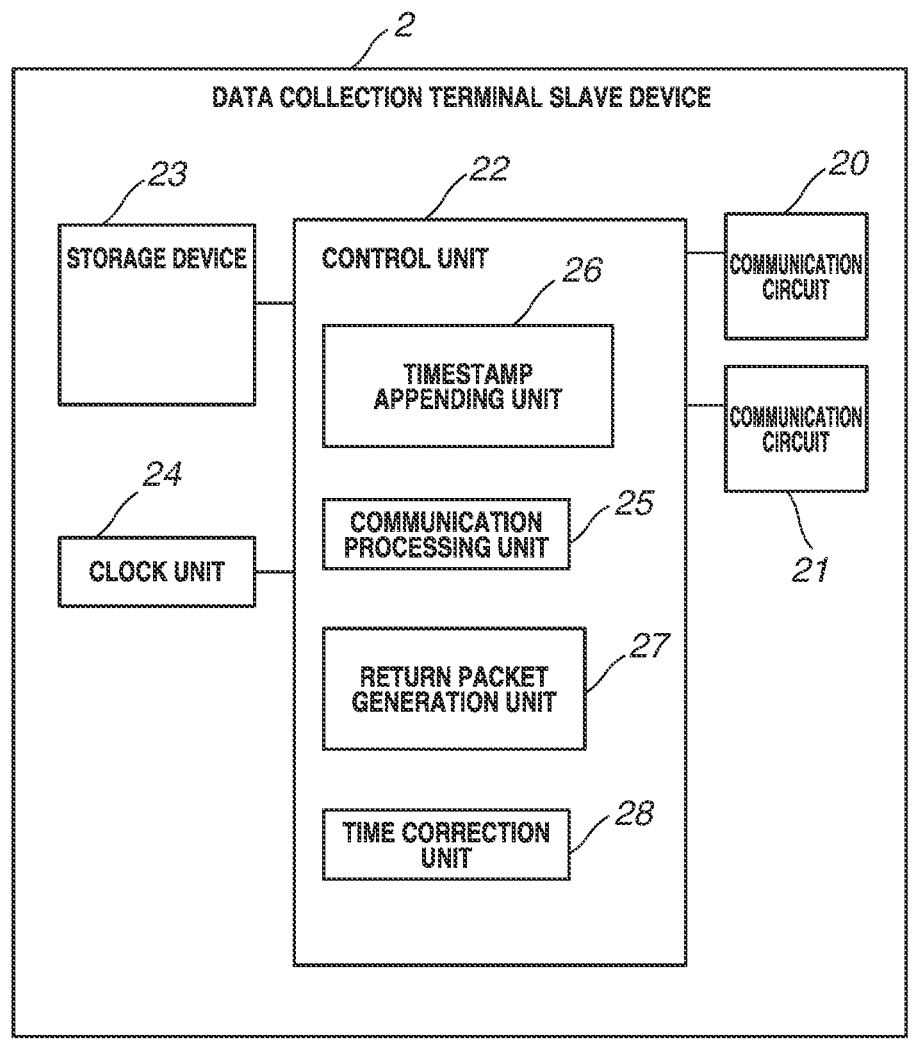
FIG. 18 is a block diagram showing the arrangement of a data collection terminal slave device of a sensing system according to the sixth embodiment of the present invention.
Figure 19:
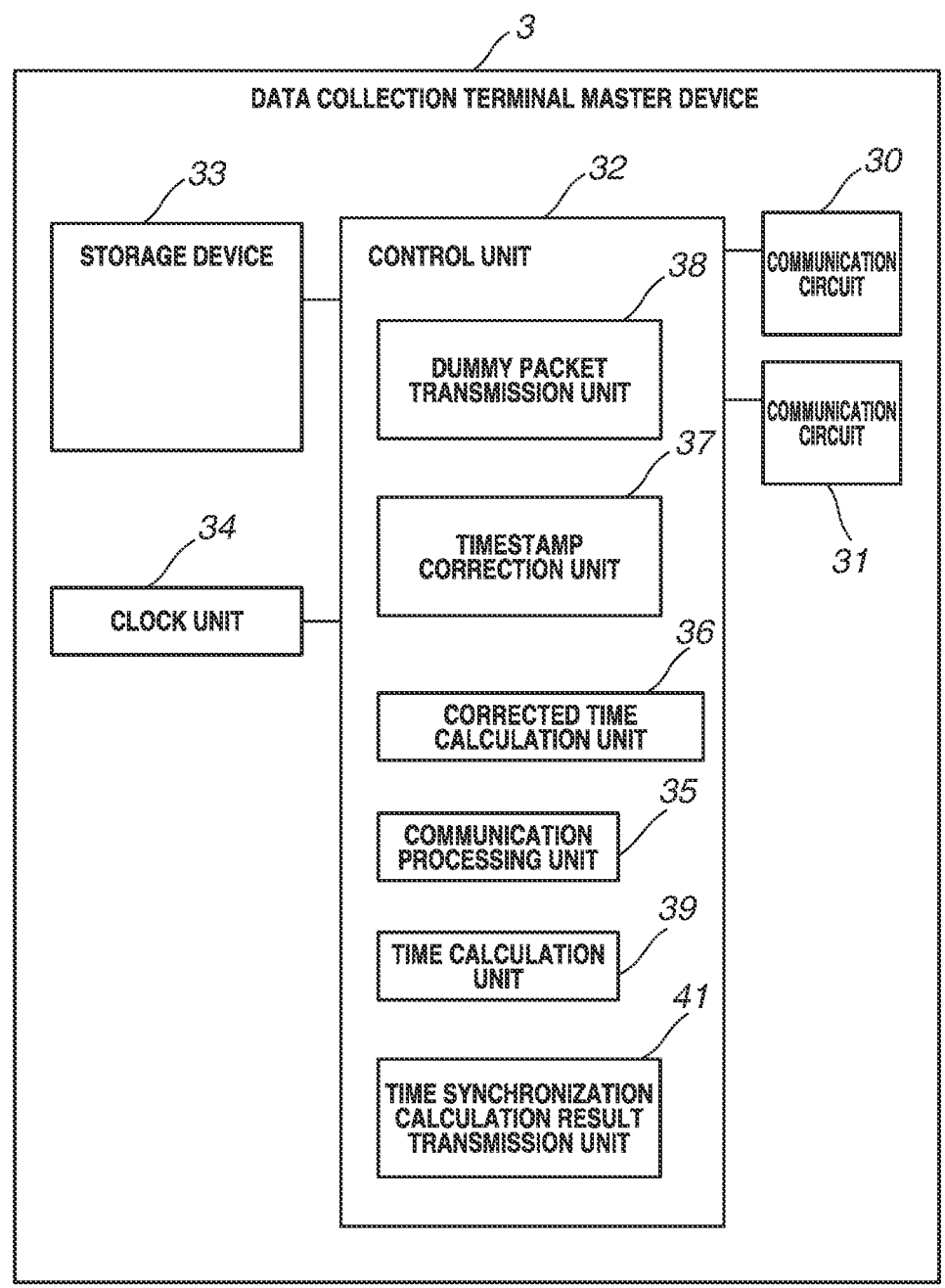
FIG. 19 is a block diagram showing the arrangement of a data collection terminal master device of the sensing system according to the sixth embodiment of the present invention.

FIG. 18 is a block diagram showing the arrangement of the data collection terminal slave device 2 of this embodiment. FIG. 19 is a block diagram showing the arrangement of the data collection terminal master device 3 of this embodiment.

A control unit 22 of the data collection terminal slave device 2 of this embodiment includes a communication processing unit 25, a timestamp appending unit 26, a return packet generation unit 27, and a time correction unit 28 for correcting time measured by a clock unit 24 based on the values of a synchronization deviation time drift and a propagation delay time delay transmitted from the data collection terminal master device 3.

A control unit 32 of the data collection terminal master device 3 of this embodiment includes a communication processing unit 35, a corrected time calculation unit 36, a timestamp correction unit 37, a dummy packet transmission unit 38, a time calculation unit 39, and a time synchronization calculation result transmission unit 41 for transmitting the values of the synchronization deviation time drift and the propagation delay time delay calculated by the time calculation unit 39 to the data collection terminal slave device 2.

Figure 20:
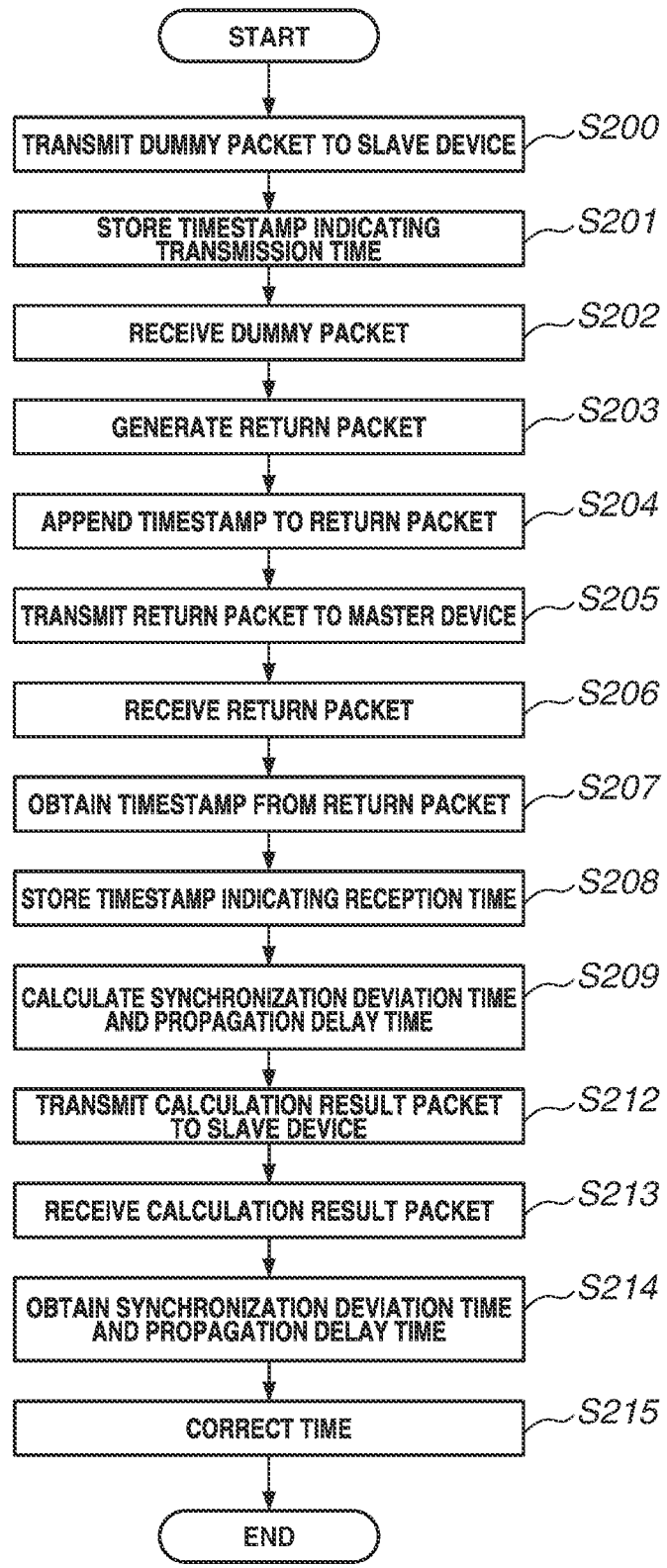
FIG. 20 is a flowchart for explaining a time synchronization process of the sensing system according to the sixth embodiment of the present invention.
Figure 21:
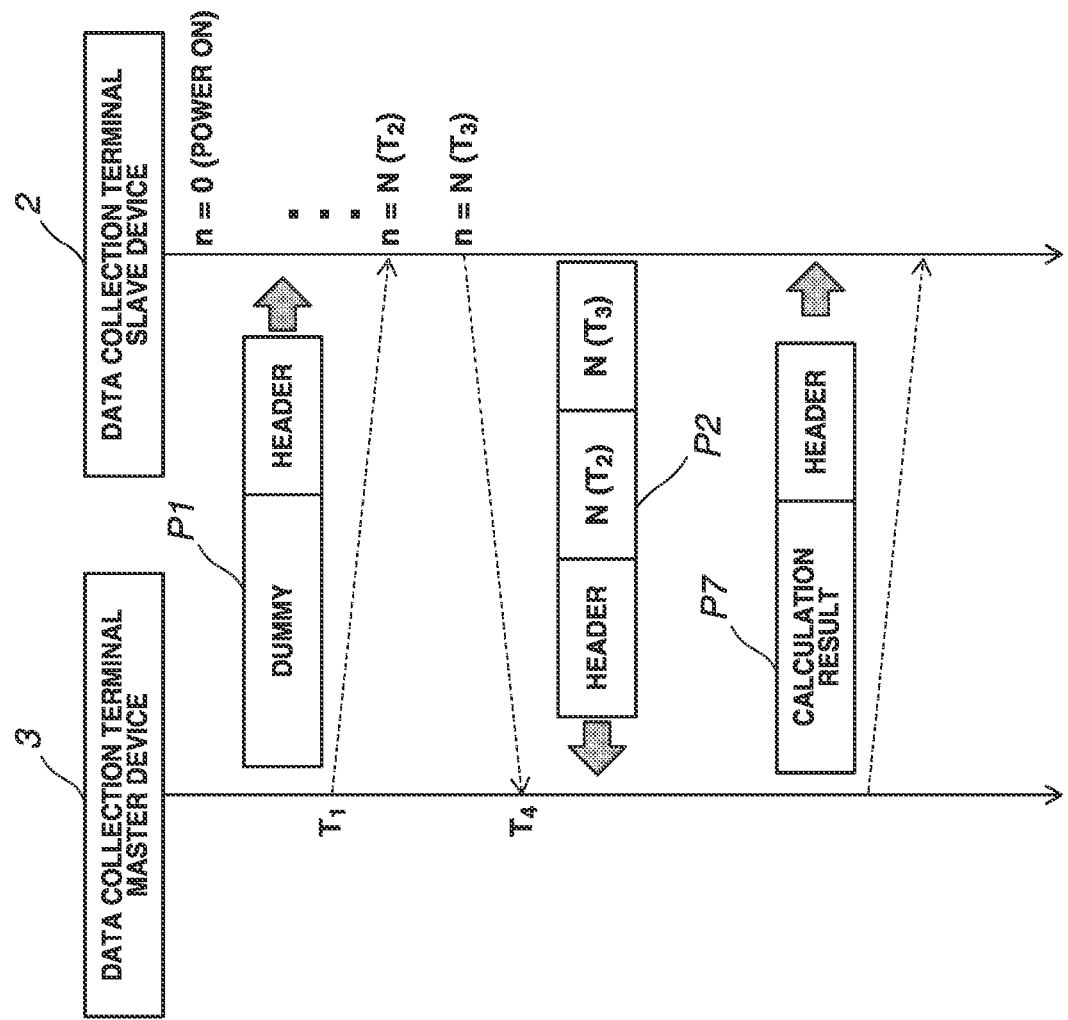
FIG. 21 is a sequence chart for explaining the time synchronization process of the sensing system according to the sixth embodiment of the present invention.

A time synchronization process of this embodiment will be explained with reference to FIGS. 20 and 21. FIG. 20 is a flowchart for explaining the time synchronization process. FIG. 21 is a sequence chart for explaining the time synchronization process.

Processes in steps S200 to S209 of FIG. 20 are the same as explained in the first embodiment.

The time synchronization calculation result transmission unit 41 of the data collection terminal master device 3 causes a communication circuit 30 to transmit, to the data collection terminal slave device 2, a calculation result packet P7 containing the values of the synchronization deviation time drift and the propagation delay time delay calculated by the time calculation unit 39 in step S209 (step S212 of FIG. 20).

Note that in order to enable the data collection terminal slave device 2 to perform time correction, the time synchronization calculation result transmission unit 41 must round the values of the synchronization deviation time drift and the propagation delay time delay to be transmitted to the data collection terminal slave device 2, to the accuracy of a unit time $T_{cycle}$ of the clock of the data collection terminal slave device 2.

When a communication circuit 21 receives the calculation result packet P7 transmitted from the data collection terminal master device 3 (step S213 of FIG. 20), the time correction unit 28 of the data collection terminal slave device 2 obtains the values of the synchronization deviation time drift and the propagation delay time delay from the calculation result packet P7 (step S214 of FIG. 20), and corrects the time measured by the clock unit 24 (step S215 of FIG. 20). More specifically, the time correction unit 28 adds the values of the synchronization deviation time drift and the propagation delay time delay to a clock count value counted by the clock unit 24.

Thus, the data collection terminal slave device 2 of this embodiment can correct the time measured by itself. In this embodiment, the operation of writing correction to the clock unit 24 is necessary in the data collection terminal slave device 2. However, the data collection terminal master device 3 performs all high-load calculations. Accordingly, even a low-performance CPU of the data collection terminal slave device 2 is applicable as long as write to the clock unit 24 is possible.

In this embodiment, not only a timestamp of the sensor 1 but also the clock of the salve device itself can be used in communication control and the like. As an example, it is possible to perform time-divisional communication and increase the number of sensors that can be accommodated per space.

Note that this embodiment uses the method of the first embodiment in the time synchronization calculation, but the third embodiment is, of course, also applicable.

In the first to sixth embodiments, the data collection terminal master device 3 is installed between the data collection terminal slave device 2 and the server (host apparatus) of the higher-level network 4. However, the present invention is not limited to this, and the data collection terminal master device 3 may also be installed in the higher-level network 4.

Figure 22:
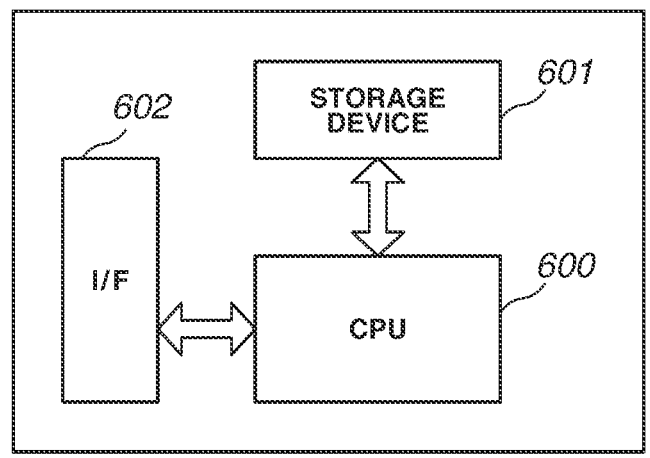
FIG. 22 is a block diagram showing a configuration example of a computer for implementing the sensors, the data collection terminal slave devices, and the data collection terminal master devices according to the first to sixth embodiments of the present invention.
Figure 23:
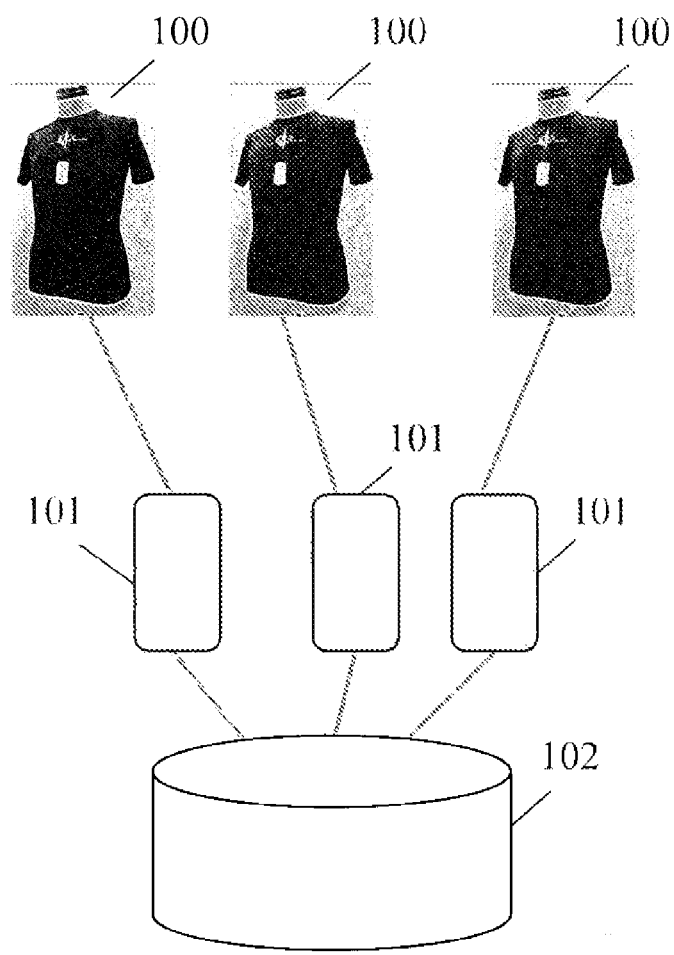
FIG. 23 is a view showing the arrangement of a conventional sensor network.
Figure 24:
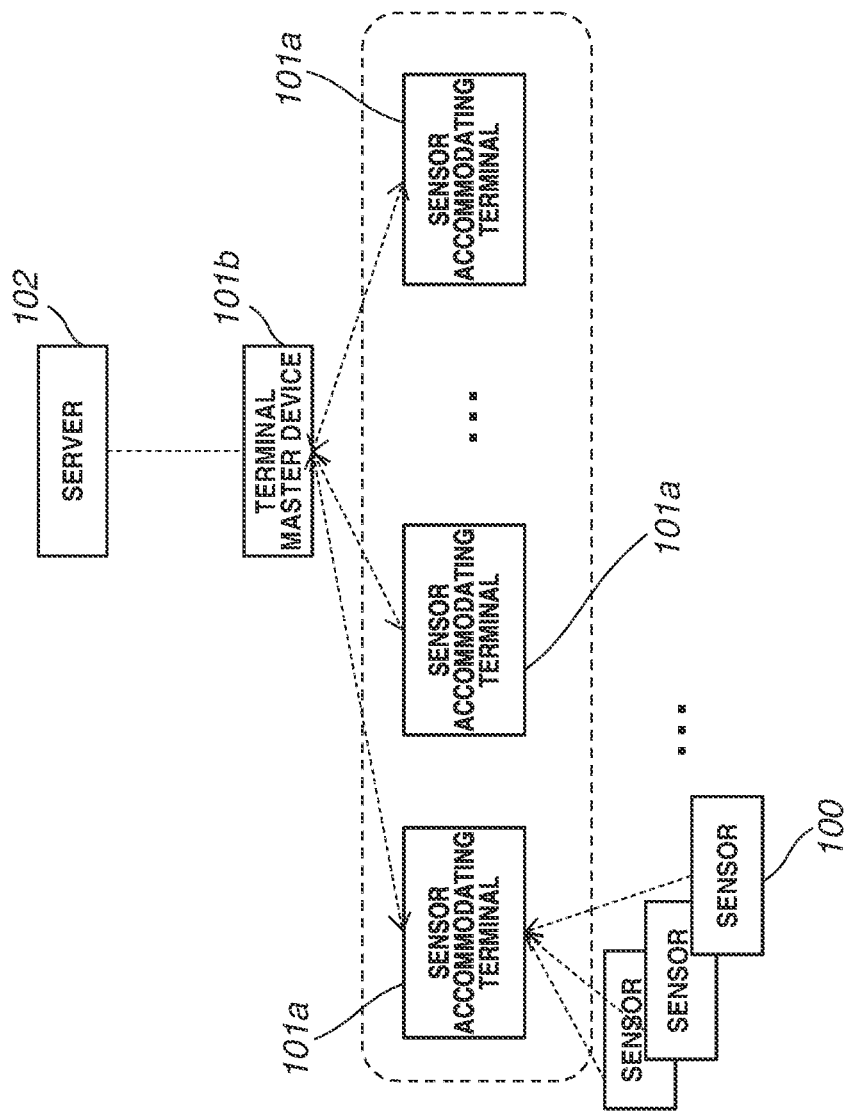
FIG. 24 is a view showing the arrangement of another conventional sensor network.

As described above, each of the sensor 1, the data collection terminal slave device 2, and the data collection terminal master device 3 of the first to sixth embodiments can be implemented by a computer and programs. FIG. 22 shows a configuration example of this computer. The computer includes a CPU 600, a storage device 601, and an interface device (to be abbreviated as I/F hereinafter) 602. When this computer constitutes the sensor 1, the I/F 602 is connected to, e.g., the communication circuit 10 and the sensor circuit unit 11. When this computer constitutes the data collection terminal slave device 2, the I/F 602 is connected to, e.g., the communication circuits 20 and 21. When this computer constitutes the data collection terminal master device 3, the I/F 602 is connected to, e.g., the communication circuits 30 and 31.

INDUSTRIAL APPLICABILITY

The present invention is applicable to a sensing system accommodating many various kinds of sensors.

EXPLANATION OF THE REFERENCE NUMERALS AND SIGNS

1 . . . sensor, 2 . . . data collection terminal slave device, 3 . . . data collection terminal master device, 4 . . . higher-level network, 10, 20, 21, 30, 31 . . . communication circuit, 11 . . . sensor circuit unit, 12, 22, 32 . . . control unit, 13, 23, 33 . . . storage device, 14, 25, 35 . . . communication processing unit, 15, 24, 34 . . . clock unit, 16, 26 . . . timestamp appending unit, 17, 27 . . . return packet generation unit, 28 . . . time correction unit, 36, 36a . . . corrected time calculation unit, 37 . . . timestamp correction unit, 38, 38a . . . dummy packet transmission unit, 39, 39a . . . time calculation unit, 40 . . . error calculation unit, 41 . . . time synchronization calculation result transmission unit

The invention claimed is:

1. A sensing system comprising:
not less than one sensor configured to transmit sensor data;
a data collection terminal master device configured to transmit the sensor data to a host apparatus; and
a data collection terminal slave device configured to relay the sensor data between the sensor and the data collection terminal master device,
wherein the sensor comprises:
a first clock unit configured to measure time;
a timestamp appending unit configured to append, to the sensor data, a timestamp indicating data transmission time based on time information of the first clock unit, when transmitting the sensor data;
a return packet generation unit configured to generate a return packet, upon receiving a dummy packet from the data collection terminal master device via the data collection terminal slave device, and append, to the return packet, a timestamp indicating reception time of the dummy packet based on the time information of the first clock unit, and a timestamp indicating transmission time of the return packet; and
a first communication processing unit configured to transmit, to the data collection terminal slave device, the sensor data to which the timestamp is appended by the timestamp appending unit, and the return packet to which the timestamps are appended by the return packet generation unit, and
the data collection terminal master device comprises:
a second clock unit configured to measure time;
a dummy packet transmission unit configured to transmit the dummy packet to the sensor, when performing a time synchronization process;
a time calculation unit configured to calculate, upon receiving the return packet, a synchronization deviation time of the data collection terminal master device and the sensor and a propagation delay time between the data collection terminal master device and the sensor, based on the transmission time of the dummy packet and the reception time of the return packet obtained from the time information of the second clock unit, and the reception time of the dummy packet and the transmission time of the return packet obtained from the timestamps of the return packet;
a corrected time calculation unit configured to calculate corrected data transmission time, upon receiving the sensor data, based on the data transmission time obtained from the timestamp of the sensor data, and the synchronization deviation time and the propagation delay time;
a timestamp correction unit configured to correct the timestamp of the sensor data based on a calculation result of the corrected time calculation unit; and
a second communication processing unit configured to transfer the sensor data containing the timestamp corrected by the timestamp correction unit to the host apparatus.

2. The sensing system according to claim 1,
the data collection terminal master device further comprises an error calculation unit configured to calculate a periodic error of a clock of the sensor, based on a plurality of values of the synchronization deviation time obtained by performing a process of transmitting the dummy packet and a process of calculating the synchronization deviation time and the propagation delay time the plurality of times, and times of the data collection terminal master device when the synchronization deviation times are calculated, and
wherein the corrected time calculation unit of the data collection terminal master device, when calculating the corrected data transmission time, calculates an error of the synchronization deviation time based on the time of the data collection terminal master device obtained from the time information of the second clock unit and the periodic error of the clock of the sensor, and calculates the corrected data transmission time based on the data transmission time obtained from the timestamp of the sensor data, the synchronization deviation time and the propagation delay time, and the error of the synchronization deviation time.

3. The sensing system according to claim 1, wherein a size of the dummy packet to be transmitted from the data collection terminal master device to the sensor, a size of the return packet to be transmitted from the sensor to the data collection terminal master device, and a size of a packet of the sensor data to be transmitted from the sensor to the data collection terminal master device via the data collection terminal slave device are the same.

4. A sensing system comprising:
not less than one sensor configured to transmit sensor data;
a data collection terminal master device configured to transmit the sensor data to a host apparatus; and
a data collection terminal slave device configured to relay the sensor data between the sensor and the data collection terminal master device,
wherein the data collection terminal slave device comprises:
a first clock unit configured to measure time;
a timestamp appending unit configured to append, to the sensor data, a timestamp indicating data transmission time based on time information of the first clock unit, upon receiving the sensor data from the sensor;
a return packet generation unit configured to generate a return packet, upon receiving a dummy packet from the data collection terminal master device, and append, to the return packet, a timestamp indicating reception time of the dummy packet based on the time information of the first clock unit, and a timestamp indicating transmission time of the return packet; and
a first communication processing unit configured to transmit, to the data collection terminal master device, the sensor data to which the timestamp is appended by the timestamp appending unit, and the return packet to which the timestamps are appended by the return packet generation unit, and
the data collection terminal master device comprises:
a second clock unit configured to measure time;
a dummy packet transmission unit configured to transmit the dummy packet to the data collection terminal slave device, when performing a time synchronization process;
a time calculation unit configured to calculate, upon receiving the return packet, a synchronization deviation time of the data collection terminal master device and the data collection terminal slave device and a propagation delay time between the data collection terminal master device and the data collection terminal slave device, based on the transmission time of the dummy packet and the reception time of the return packet obtained from the time information of the second clock unit, and the reception time of the dummy packet and the transmission time of the return packet obtained from the timestamps of the return packet;
a corrected time calculation unit configured to calculate corrected data transmission time, upon receiving the sensor data, based on the data transmission time obtained from the timestamp of the sensor data, and the synchronization deviation time and the propagation delay time;
a timestamp correction unit configured to correct the timestamp of the sensor data based on a calculation result of the corrected time calculation unit; and
a second communication processing unit configured to transfer the sensor data containing the timestamp corrected by the timestamp correction unit to the host apparatus.

5. The sensing system according to claim 4,
the data collection terminal master device further comprises an error calculation unit configured to calculate a periodic error of a clock of the data collection terminal slave device, based on a plurality of values of the synchronization deviation time obtained by performing a process of transmitting the dummy packet and a process of calculating the synchronization deviation time and the propagation delay time the plurality of times, and times of the data collection terminal master device when the synchronization deviation times are calculated, and
wherein the corrected time calculation unit of the data collection terminal master device, when calculating the corrected data transmission time, calculates an error of the synchronization deviation time based on the time of the data collection terminal master device obtained from the time information of the second clock unit and the periodic error of the clock of the data collection terminal slave device, and calculates the corrected data transmission time based on the data transmission time obtained from the timestamp of the sensor data, the synchronization deviation time and the propagation delay time, and the error of the synchronization deviation time.

6. The sensing system according to claim 4,
the data collection terminal master device further comprises a time synchronization calculation result transmission unit configured to transmit the values of the synchronization deviation time and the propagation delay time calculated by the time calculation unit to the data collection terminal slave device, and
the data collection terminal slave device further comprises a time correction unit configured to correct the time measured by the first clock unit based on the values of the synchronization deviation time and the propagation delay time transmitted from the data collection terminal master device.

7. The sensing system according to claim 4, wherein a size of the dummy packet to be transmitted from the data collection terminal master device to the data collection terminal slave device, a size of the return packet to be transmitted from the data collection terminal slave device to the data collection terminal master device, and a size of a packet of the sensor data to be transferred from the data collection terminal slave device to the data collection terminal master device are the same.

8. A time synchronization method including:
a first step of causing a data collection terminal master device to transmit a dummy packet to a sensor when performing a time synchronization process;
a second step of causing the sensor to generate a return packet upon receiving the dummy packet from the data collection terminal master device via a data collection terminal slave device, and append, to the return packet, a timestamp indicating reception time of the dummy packet and a timestamp indicating transmission time of the return packet, based on time information of a first clock unit in the sensor;
a third step of causing the sensor to transmit the return packet to which the timestamps are appended, to the data collection terminal slave device;
a fourth step of causing, upon receiving the return packet from the sensor via the data collection terminal slave device, the data collection terminal master device to calculate a synchronization deviation time of the data collection terminal master device and the sensor and a propagation delay time between the data collection terminal master device and the sensor, based on the transmission time of the dummy packet and the reception time of the return packet obtained from time information of a second clock unit in the data collection terminal master device, and the reception time of the dummy packet and the transmission time of the return packet obtained from the timestamps of the return packet;

a fifth step of causing, when transmitting sensor data, the sensor to append a timestamp indicating data transmission time to the sensor data based on the time information of the first clock unit;

a sixth step of causing the sensor to transmit the sensor data to which the timestamps are appended, to the data collection terminal slave device;

a seventh step of causing, upon receiving the sensor data from the sensor via the data collection terminal slave device, the data collection terminal master device to calculate corrected data transmission time, based on the data transmission time obtained from the timestamp of the sensor data, and the synchronization deviation time and the propagation delay time;

an eighth step of causing the data collection terminal master device to correct the timestamp of the sensor data based on a calculation result in the seventh step; and a ninth step of causing the data collection terminal master device to transfer the sensor data containing the corrected timestamp to a host apparatus.

9. The time synchronization method according to claim 8, further comprising a 10th step of causing the data collection terminal master device to calculate a periodic error of a clock of the sensor, based on a plurality of values of the synchronization deviation time obtained by performing a process of transmitting the dummy packet and a process of calculating the synchronization deviation time and the propagation delay time the plurality of times, and times of the data collection terminal master device when the synchronization deviation times are calculated, wherein the seventh step includes a step of calculating, when calculating the corrected data transmission time, an error of the synchronization deviation time based on the time of the data collection terminal master device obtained from the time information of the second clock unit and the periodic error of the clock of the sensor, and calculating the corrected data transmission time based on the data transmission time obtained from the timestamp of the sensor data, the synchronization deviation time and the propagation delay time, and the error of the synchronization deviation time.

10. A time synchronization method comprising:

a first step of causing a data collection terminal master device to transmit a dummy packet to a data collection terminal slave device when performing a time synchronization process;

a second step of causing the data collection terminal slave device to generate a return packet upon receiving the dummy packet, and append, to the return packet, a timestamp indicating reception time of the dummy packet and a timestamp indicating transmission time of the return packet, based on time information of a first clock unit in the data collection terminal slave device;

a third step of causing the data collection terminal slave device to transmit the return packet to which the timestamps are appended, to the data collection terminal master device;

a fourth step of causing, upon receiving the return packet, the data collection terminal master device to calculate a synchronization deviation time of the data collection terminal master device and the data collection terminal slave device and a propagation delay time between the data collection terminal master device and the data collection terminal slave device, based on the transmission time of the dummy packet and the reception time of the return packet obtained from time information of a second clock unit in the data collection terminal master device, and the reception time of the dummy packet and the transmission time of the return packet obtained from the timestamps of the return packet;

a fifth step of causing, upon receiving sensor data from a sensor, the data collection terminal slave device to append a timestamp indicating data transmission time to the sensor data based on the time information of the first clock unit;

a sixth step of causing the data collection terminal slave device to transmit the sensor data to which the timestamps are appended, to the data collection terminal master device;

a seventh step of causing, upon receiving the sensor data from the data collection terminal slave device, the data collection terminal master device to calculate corrected data transmission time, based on the data transmission time obtained from the timestamp of the sensor data, and the synchronization deviation time and the propagation delay time;

an eighth step of causing the data collection terminal master device to correct the timestamp of the sensor data based on a calculation result in the seventh step; and a ninth step of causing the data collection terminal master device to transfer the sensor data containing the corrected timestamp to a host apparatus.

11. The time synchronization method according to claim 10, further comprising a 10th step of causing the data collection terminal master device to calculate a periodic error of a clock of the data collection terminal slave device, based on a plurality of values of the synchronization deviation time obtained by performing a process of transmitting the dummy packet and a process of calculating the synchronization deviation time and the propagation delay time the plurality of times, and times of the data collection terminal master device when the synchronization deviation times are calculated, wherein the seventh step includes a step of calculating, when calculating the corrected data transmission time, an error of the synchronization deviation time based on the time of the data collection terminal master device obtained from the time information of the second clock unit and the periodic error of the clock of the data collection terminal slave device, and calculating the corrected data transmission time based on the data transmission time obtained from the timestamp of the sensor data, the synchronization deviation time and the propagation delay time, and the error of the synchronization deviation time.

12. The time synchronization method according to claim 10, further comprising:

an 11th step of causing the data collection terminal master device to transmit values of the synchronization deviation time and the propagation delay time calculated in the fourth step to the data collection terminal slave device; and a 12th step of causing the data collection terminal slave device to correct the time measured by the first clock unit, based on the values of the synchronization deviation time and the propagation delay time transmitted from the data collection terminal master device.

13. The sensing system according to claim 2, wherein a size of the dummy packet to be transmitted from the data collection terminal master device to the sensor, a size of the return packet to be transmitted from the sensor to the data collection terminal master device, and a size of a packet of the sensor data to be transmitted from the sensor to the data collection terminal master device via the data collection terminal slave device are the same.

14. The sensing system according to claim 5, the data collection terminal master device further comprises a time synchronization calculation result transmission unit configured to transmit the values of the synchronization deviation time and the propagation delay time calculated by the time calculation unit to the data collection terminal slave device, and the data collection terminal slave device further comprises a time correction unit configured to correct the time measured by the first clock unit based on the values of the synchronization deviation time and the propagation delay time transmitted from the data collection terminal master device.

15. The sensing system according to claim 5, wherein a size of the dummy packet to be transmitted from the data collection terminal master device to the data collection terminal slave device, a size of the return packet to be transmitted from the data collection terminal slave device to the data collection terminal master device, and a size of a packet of the sensor data to be transferred from the data collection terminal slave device to the data collection terminal master device are the same.

16. The sensing system according to claim 6, wherein a size of the dummy packet to be transmitted from the data collection terminal master device to the data collection terminal slave device, a size of the return packet to be transmitted from the data collection terminal slave device to the data collection terminal master device, and a size of a packet of the sensor data to be transferred from the data collection terminal slave device to the data collection terminal master device are the same.

17. The time synchronization method according to claim 11, further comprising:
  an 11th step of causing the data collection terminal master device to transmit values of the synchronization deviation time and the propagation delay time calculated in the fourth step to the data collection terminal slave device; and
  a 12th step of causing the data collection terminal slave device to correct the time measured by the first clock unit, based on the values of the synchronization deviation time and the propagation delay time transmitted from the data collection terminal master device.

* * * * *